(12) United States Patent
Werho et al.

(10) Patent No.: US 10,796,252 B2
(45) Date of Patent: Oct. 6, 2020

(54) INDUCED MARKOV CHAIN FOR WIND FARM GENERATION FORECASTING

(71) Applicants: Trevor N. Werho, Mesa, AZ (US);
Junshan Zhang, Tempe, AZ (US);
Vijay Vittal, Scottsdale, AZ (US)

(72) Inventors: Trevor N. Werho, Mesa, AZ (US);
Junshan Zhang, Tempe, AZ (US);
Vijay Vittal, Scottsdale, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 0 days.

(21) Appl. No.: 16/555,490

(22) Filed: Aug. 29, 2019

(65) Prior Publication Data

US 2020/0082305 A1   Mar. 12, 2020

Related U.S. Application Data

(60) Provisional application No. 62/727,827, filed on Sep. 6, 2018.

(51) Int. Cl.
*G06Q 10/04*  (2012.01)
*G06Q 50/06*  (2012.01)
(Continued)

(52) U.S. Cl.
CPC .............. *G06Q 10/04* (2013.01); *G01W 1/10* (2013.01); *G06N 7/005* (2013.01);
(Continued)

(58) Field of Classification Search
CPC ......... G06Q 10/04; G06Q 50/06; H02J 3/386; H02J 2003/007; G06N 7/005
See application file for complete search history.

(56) References Cited

U.S. PATENT DOCUMENTS

| | | |
|---|---|---|
| 6,359,635 B1 | 3/2002 | Perttunen |
| 6,975,925 B1 | 12/2005 | Barnes et al. |

(Continued)

OTHER PUBLICATIONS

Mallik, Rajarshi, et al. "Distributed data mining for sustainable smart grids." Proc. of ACM SustKDD 11 (2011) (Year: 2011).*

(Continued)

*Primary Examiner* — Bernard G Lindsay
(74) *Attorney, Agent, or Firm* — Snell & Wilmer L.L.P.

(57) ABSTRACT

Systems and methods for forecasting power generation in a wind farm are disclosed. The systems and methods utilize an induced Markov chain model to generate a forecast of power generation of the wind farm. The forecast is at least one of a point forecast or a distributional forecast. Additionally, the systems and methods modify at least one of: (i) a generation of electricity at a power plant coupled to a common power grid as the wind farm; or (ii) a distribution of electricity in the common power grid based on the forecast of power generation of the wind farm. In an exemplary approach, utilizing the induced Markov chain model to generate the forecast may include determining a series of time adjacent power output measurements based on historical wind power measurements and calculating a time series of difference values based on the series of time adjacent power output measurements.

13 Claims, 15 Drawing Sheets

(51) Int. Cl.
*G06N 7/00* (2006.01)
*G06Q 30/02* (2012.01)
*G01W 1/10* (2006.01)
*H02J 3/38* (2006.01)

(52) U.S. Cl.
CPC ......... *G06Q 30/0283* (2013.01); *G06Q 50/06* (2013.01); *H02J 3/386* (2013.01); *H02J 2203/20* (2020.01)

(56) References Cited

U.S. PATENT DOCUMENTS

| | | | |
|---|---|---|---|
| 7,023,205 | B1 | 4/2006 | Krupp |
| 8,200,435 | B2 | 6/2012 | Stiesdal |
| 9,460,478 | B2 | 10/2016 | Zhang et al. |
| 10,159,079 | B2 | 12/2018 | Zhang et al. |
| 10,181,101 | B2 | 1/2019 | Zhang et al. |
| 2003/0160457 | A1 | 8/2003 | Ragwitz et al. |
| 2005/0168240 | A1 | 8/2005 | Martin et al. |
| 2008/0307853 | A1* | 12/2008 | Siebers ............... G01P 21/025 73/1.29 |
| 2010/0030534 | A1* | 2/2010 | Reich ................. G06F 17/5009 703/2 |
| 2012/0011481 | A1* | 1/2012 | Dwivedi ............ G06F 17/5081 716/109 |
| 2012/0046917 | A1 | 2/2012 | Fang et al. |
| 2012/0281641 | A1* | 11/2012 | Cui .................... H04W 52/346 370/329 |
| 2013/0096983 | A1* | 4/2013 | Forbes ............... G06Q 30/0202 705/7.31 |
| 2014/0172329 | A1* | 6/2014 | Zhang .................. G06Q 50/06 702/60 |
| 2015/0154504 | A1* | 6/2015 | Zhang ................... G06N 7/005 706/52 |
| 2018/0188301 | A1* | 7/2018 | McBrearty ............ G06Q 10/04 |
| 2019/0013669 | A1* | 1/2019 | Davies ............. G06Q 10/06315 |
| 2019/0089760 | A1 | 3/2019 | Zhang et al. |
| 2019/0116587 | A1 | 4/2019 | Zhang et al. |

OTHER PUBLICATIONS

"Detection and Statistics of Wind Power Ramps" IEEE Transactions on Power Systems, vol. 28, No. 4, Nov. 2013 (Year: 2013).*

Pesch et al. 'A new Markov-chain-related statistical approach for modelling synthetic wind power time series' New J. Phys. 17 (2015) 055001.*

Zhu et al. 'Improved photovoltaic power sequence prediction method based on Markov chain' English translation of Chinese Patent Document CN105139080 (2015).*

H. Madsen, P. Pinson, G. Kariniotakis, H.A.Nielsen, and T. S.Nielsen, "Standardizing the performance evaluation of short-term wind power prediction models," Wind Engineering, vol. 29, No. 6, pp. 475-489, 2005.

L.Yang et al., "Stochastic Optimization Based Economic Dispatch and Interruptible Load Management with Distributional Forecast of Wind Farm Generation," 53rd IEEE Conference on Decision and Control, L.A., Cal., pp. 199-204, Dec. 15-17, 2014.

Ucilia Wang, "What Electric Grid Operators Want: Good Wind Energy Forecasts," Forbes (May 30, 2012) http://www.forbes.com/sites/uciliawang/2012/05/30/what-electric-grid-operators-want-good-wind-energy-forecasts/.

A. Carpinone et al., "Very Short-Term Probabilistic Wind Power Forecasting Based on Markov Chain Models," pp. 107-112, IEEE PMAPS 2010.

L. Yang, "Stochastic Optimization and Real-Time Scheduling in Cyber-Physical Systems", PhD thesis, Arizona State University, Dec. 2012.

R. Burrett, et al., "Renewables Global Status Report," Renewable Energy Policy Network for the 21st Century, 2009.

R.C. Prim, "Shortest Connection Networks and Some Generalizations," The Bell System Technical Journal, vol. 36, pp. 1389-1401, 1957.

E.S. Takle et al., "Note on the Use of Weibull Statistics to Characterize Wind-Speed Data," Journal of Applied Meteorology, vol. 17, pp. 556-559. 1978.

Qinging Zhang et al., "Finite-State Markov Model for Rayleigh Fading Channels," IEEE Transactions on Communications, vol. 47, No. 11, pp. 1688-1692, 1999.

J.L. Torres et al., "Forecast of Hourly Average Wind Speed with ARMA Models in Navarre (Spain)," Solar Energy, vol. 79, No. 1, pp. 65-77, 2005.

MEJ Newman, "Power Laws, Pareto Distributions and Zipfs Law," Contemporary Physics, vol. 46, No. 5, pp. 323-351, 2005.

M.S. Miranda et al., "One-Hour-Ahead Wind Speed Prediction Using a Bayesian Methodology," IEEE Power Engineering Society General Meeting, 2006.

C.W. Potter et al., "Very Short-Term Wind Forecasting for Tasmanian Power Generation," IEEE Transactions on Power Systems, vol. 21, No. 2, pp. 965-972, 2006.

K.S. Cory et al., "Renewable Portfolio Standards in the States: Balancing Goals and Implementation Strategies," National Renewable Energy Laboratory Technical Report, NREL/TP-670-41409, 2007.

G. Papaeflhymiou et al., "MCMC for Wind Power Simulation," IEEE Transactions on Energy Conversion, vol. 23, No. 1, pp. 234-240, 2008.

M. He et al. "Multiple Timescale Dispatch and Scheduling for Stochastic Reliability in Smart Grids with Wind Generation Integration," IEEE Infocom 2011, pp. 461-465, 2011.

P.P. Varaiya et al., "Smart Operation of Smart Grid: Rick-Limiting Dispatch," Proceedings of the IEEE, vol. 99, No. 1, pp. 40-57, 2011.

S. Murugesan et al., "Finite State Markov Chain Model for Wind Generation Forecast: A Data-driven Spatiotemporal Approach," Innovative Smart Grid Technologies (ISGT), 2012 IEEE PES, 2012.

USPTO; Non-Final Office Action in the U.S. Appl. No. 14/109,586 dated Mar. 31, 2016.

USPTO; Notice of Allowance in the U.S. Appl. No. 14/109,586 dated Aug. 26, 2016.

Ramon van Handel, Hidden Markov Models, published on Jul. 28, 2008.

USPTO; Non-Final Office Action in the U.S. Appl. No. 14/572,385 dated Feb. 8, 2018.

USPTO; Final Office Action in the U.S. Appl. No. 14/572,385 dated Oct. 13, 2017.

USPTO; Non-Final Office Action in the U.S. Appl. No. 14/572,385 dated May 19, 2017.

USPTO; Advisory Action in the U.S. Appl. No. 14/572,385 dated Dec. 19, 2017.

USPTO; Notice of Allowance in the U.S. Appl. No. 14/572,385 dated Nov. 29, 2018.

K.S. Cory and B.G. Swezey, "Renewable Portfolio Standards in the States: Balancing Goals and Implementation Strategies," NREL Technical Report TP-670-41409, Dec. 2007.

G. Kariniotakis, et al., "Advanced Short-term Forecasting of Wind Generation-Anemos," IEEE Transactions on Power Systems, 2006.

C. W. Potter and M. Negnevistsky, "Very Short-Term Wind Forecasting for Tasmanian Power Generation," 21 IEEE Transactions on Power Systems, vol. 21, No. 2, pp. 965-972, May 2006.

M. S. Miranda and R. W. Dunn, "One-hour-ahead Wind Speed Prediction Using a Bayesian Methodology," IEEE Sower Engineering Society General Meeting, 2006.

M. He, S. Murugesan and J_ Zhang, "Multiple Timescale Dispatch and Scheduling for Stochastic Reliability in Smart Grids with Wind Generation Integration," Proc. IEEE INFOCOM 2011 Mini-Conference, Shanghai, China, pp. 461-465, Apr. 2011.

P. P. Varaiya, F. F. Wu and J_ W. Bialek, "Smart Operation of Smart Grid: Risk-Limiting Dispatch," Proceedings of the IEEE, vol. 99., No. 1, pp. 40-57, Jan. 2011.

S. Murugesan, J_ Zhang and V. Vittal, "Finite State Markov Chain Model for Wind Generation Forecast: A Data-driven Spatiotemporal Approach," Innovative Smart Grid Technologies, 2012 IEEE PES, pp. 1-8, Jan. 2012.

(56) References Cited

OTHER PUBLICATIONS

N. Abdel-Karim, M. Small and M. Ilic, "Short Term Wind Speed Prediction by Finite and Infinite Impulse Response Filters: A State Space Model Representation Using Discrete Markov Process," IEEE Bucharest Power Tech Conference, Bucharest, 2009.

R. C. Prim, "Shortest Connection Networks and Some Generalizations," The Bell System Technical Journal, vol. 36, pp. 1389-1401, Nov. 1957.

E. S. Takle and J_ M. Brown, "Note on the Use of Weibull Statistics to Characterize Wind Speed Data," Journal of Applied Meteorology, 17, pp. 556-559, Apr. 1978.

Q_ Zhang and S. A. Kassam,"Finite-state Markov Model for Rayleigh Fading Channels," IEEE Transactions on Communications, vol. 47, No. 11, pp. 1688-1692, Nov. 1999.

G. Papaeflhymiou and B. Klockl, "MCMC for Wind Power Simulation," IEEE Transactions on Energy Conversion, vol. 23, No. 1, pp. 234-240, Mar. 2008.

M. He, et al., "A Spatio-temporal Analysis Approach for Short-Term Forecast of Wind Farm Generation", 29 IEEE Transactions on Power Systems, vol. 29, No. 4, pp. 1611-1622, Jul. 2014.

L. Xie, P. P Carvalho, L. Ferreira, J_ Liu, B. Krogh, N. Popli, and M. Ilic, "Wind Integration in Power Systems: Operational Challenges and Possible Solutions," Proceedings of the IEEE, vol. 99, No. 1, pp. 214-232, Jan. 2011.

D. Lew, M. Milligan, G. Jordan, and R. Piwko, "The Value of Wind Power Forecasting," NREL Conference Paper CP-5500-50814, Apr. 2011.

G. Giebel, R. Brownsword, G. Kariniotakis, M. Denhard, and C. Draxl, "The State of the Art in Short-Term Prediction of Wind Power—A Literature Overview, 2nd Edition," ANEMOS.plus/safewind, Jan. 2011, available at, http://www.anemos-plus.eu/images/pubs/deliverables/aplus.deliverable d1 .2.stp sota v1 .1.pdf.

C. Monteiro, H. Keko, R. Bessa, V. Miranda, A. Botterud, J_ Wang, G. Conzelmann, and I. Porto, "A Quick Guide to Wind Power Forecasting: State-of-the-art 2009," Argonne National Laboratory, Nov. 2009, available at, http://www.dis.anl.gov/pubs/65614.pdf.

P. Pinson and H. Madsen, "Probabilistic Forecasting of Wind Power at the Minute Time-Scale with Markov-Switching Autoregressive Models," in Probabilistic Methods Applied to Power Systems, Proceedings of the 10th International Conference, pp. 1-8, May 2008.

P. Pinson and H. Madsen, "Adaptive Modelling and Forecasting of Offshore Wind Power Fluctuations with Markov-switching Autoregressive Models," Journal of Forecasting, vol. 31, No. 4, pp. 281-313, 2012.

T. S. Nielsen et al., "Short-term Wind Power Forecasting Using Advanced Statistical Methods," in Proceedings of European Wind Energy Conference, Athens, Greece, pp. 1-9, 2006.

J_ Catalao, H. M. I. Pousinho, and V. Mendes, "Hybrid Wavelet-PSO-ANFIS Approach for Short-term Wind Power Forecasting in Portugal," Sustainable Energy, IEEE Transactions, vol. 2, No. 1, pp. 50-59, 2011.

P. Pinson and G. Kariniotakis, "Wind Power Forecasting Using Fuzzy Neural Networks Enhanced with On-line Prediction Risk Assessment," in Power Tech Conference, 2003 IEEE Bologna, vol. 2, 2003.

J_ Zeng and W. Qiao, "Support Vector Machine-based Short-term Wind Power Forecasting," in Power Systems Conference and Exposition, 2011 IEEE/PES, pp. 1-8, 2011.

S. Santoso, M. Negnevitsky, and N. Hatziargyriou, "Data Mining and Analysis Techniques in Wind Power System Applications: Abridged," in Power Engineering Society General Meeting, 2006. IEEE, pp. 1-3, 2006.

A. Kusiak, H. Zheng, and Z. Song, "Wind Farm Power Prediction: A Data-mining Approach," Wind Energy, vol. 12, No. 3, pp. 275-293, 2009.

H. Y. Zheng and A. Kusiak, "Prediction of Wind Farm Power Ramp Rates: A Data-mining Approach," ASME Journal of Solar Energy Engineering, vol. 131, pp. 031011-1-031011-8, Aug. 2009.

C. Potter, E. Grimit, and B. Nijssen, "Potential Benefits of a Dedicated Probabilistic Rapid Ramp Event Forecast Tool,"in Power Systems Conference and Exposition, IEEE/PES, pp. 1-5, 2009.

H. Zareipour, D. Huang, and W. Rosehart, "Wind Power Ramp Events Classification and Forecasting: A Data Mining Approach," Power and Energy Society General Meeting, 2011 IEEE, pp. 1-3, 2011.

M. Lei, L. Shiyan, J_ Chuanwen, L. Hongling, and Z. Yan, "A Review on the Forecasting of Wind Speed and Generated Power," Renewable and Sustainable Energy Reviews, vol. 13, No. 4, pp. 915-920, 2009.

C. Ferreira, J_ Gama, L. Matias, A. Botterud, and J_ Wang, "A Survey on Wind Power Ramp Forecasting." Argonne National Laboratory, Dec. 2010, available at http://www.dis.anl.gov/pubs/69166.pdf.

C. Karnath, "Understanding Wind Ramp Events through Analysis of Historical Data," Transmission and Distribution Conference and Exposition, IEEE PES, 2010.

Department of Communications, Energy and Natural Resources, "All Island Grid Study, Work Stream 4, Analysis of Impacts and Benefits." Available at http://www.dcenr.gov.ie/Energy/North-South+Co-operation+in+the+Energy+Sector/All+Island+Electricity+Grid+Study.htm, Jan. 2008.

"WILMAR (Wind Power Integration in Liberalised Electricity Markets)," Available at, http://www.wilmar.risoe.dk/index.him, Mar. 2012.

L. Yang, et al., "Support Vector Machine Enhanced Markov Model for Short-term Wind Power Forecast," Chapter 3, pp. 35-57, Nov. 2014.

C. W. Hsu and C. J_ Lin, "A Comparison of Methods for Multiclass Support Vector Machines," IEEE Transactions on Neural Networks, vol. 13, No. 2, pp. 415-425, Mar. 2002.

C. Hsu, C. Chang, and C. Lin, "A Practical Guide to Support Vector Classification," Department of Computer Science, National Taiwan University, Apr. 2010.

C. C. Chang and C. J_ Lin, "LIBSVM: A Library for Support Vector Machines," ACM Transactions on Intelligent Systems and Technology, vol. 2, pp. 27:1-27:27, 2011. Software available at http://www.csie.ntu.edu.tw/cjlin/libsvm.

C. J_ Burges, "A Tutorial on Support Vector Machines for Pattern Recognition," Data Mining and Knowledge Discovery, vol. 2, pp. 121-167, 1998.

E. A. DeMeo et al., "Accommodating Wind's Natural Behavior," IEEE Power Energy Magazine, vol. 5, pp. 59-67, Nov.-Dec. 2007.

S. Fink, C. Mudd, K. Porter, and B. Morgenstern, "Wind Energy Curtailment Case Studies," NREL Subcontract Report, Oct. 2009, Rep. SR-550-46716.

F. Cassola and M. Burlando, "Wind Speed and Wind Energy Forecast through Kalman Filtering of Numerical Weather Prediction Model Output," Applied Energy, vol. 99, pp. 154-166, 2012.

P. Pinson and G. Kariniotakis, "Conditional Prediction Intervals of Wind Power Generation," IEEE Transactions on Power Systems, vol. 25, No. 4, pp. 1845-1856, Nov. 2010.

NSF Initiative on "Core Techniques and Technologies for Advancing Big Data Science & Engineering (BIGDA TA)," 2012, http://www.nsf.gov/pubs/2012/nsf12499/nsf12499.htm#toc.

A. Lau and P. McSharry, "Approaches for Multi-step Density Forecasts with Application to Aggregated Wind Power," Annals of Applied Statistics, vol. 4, No. 3, pp. 1311-1341, 2010.

P. Pinson, "Very Short-term Probabilistic Forecasting of Wind Power Time-series with Generalized Logit-normal Distributions," J_ R. Statist. Soc.: Series C (Applied Statistics), vol. 61, No. 4, pp. 555-576, 2012.

M. He, L. Yang, J_ Zhang, and V. Vittal, "Spatio-temporal Analysis for Smart Grids with Wind Generation Integration," International Conference on Computing, Networking and Communications, pp. 1107-1111, 2013.

P. Luh, Y.Yu, B. Zhang, E. Litvinov, T. Zheng, F. Zhao, J_ Zhao, and C. Wang, "Grid Integration of Intermittent Wind Generation: A Markovian Approach," IEEE Transactions on Smart Grid, vol. 5, No. 2, pp. 732-741, Mar. 2014.

(56) References Cited

OTHER PUBLICATIONS

D. Kugiumtzis and E. Bora-Senta, "Gaussian Analysis of Non-Gaussian Time Series," Brussels Economic Review, vol. 53, No. 2, pp. 295-322, 2010.

NERC IVGTF Task 2.1 report, "Variable Generation Power Forecasting for Operations," May 2010, available at http://www.nerc.com/docs/pc/ivgtf/Task2-1 (5.20).pdf.

GWEC staff, "Global Wind Report 2016—Annual market update", Global Wind Energy Council 2016. [Online] Available: http://www.gwec.net/publications/global-wind-report-2/global-wind-report-2016/.

X. Zhu, Wind Speed Forecasting for Power Systems Operation, Ph.D. Thesis, Texas A&M University, Texas, USA, 2013.

J. Jung, R.P. Broadwater, "Current status and future advances for wind speed and power forecasting," Renewable and Sustainable Energy Reviews, vol. 31, pp. 762-777, 2014.

G. Giebel, R. Brownsword, G. Kariniotakis, M. Denhard, C. Draxl, The State-of-the-Art in Short-Term Prediction of Wind Power, Sophia Antipolis, France: ANEMOS.plus, 2011.

M. Negnevitsky, C. W. Potter, "Innovative Short-Term Wind Generation Prediction Techniques," Power Systems Conference and Exposition, IEEE PES, 2006.

M. He, L. Yang, J. Zhang, V. Vittal, "A spatio-temporal analysis approach for short-term forecast of wind farm generation," IEEE Transactions of Power Systems, vol. 29, No. 4, pp. 1611-1622, Jul. 2014.

L. Yang, M. He, J. Zhang, V. Vittal, "Support-Vector-Machine-Enhanced Markov Model for Short-Term Wind Power Forecast," IEEE Transactions on Power Systems, vol. 6, No. 3, Jul. 2015.

A. Carpinone, R. Langella, A. Testa, M. Giorgio, "Very short-term probabilistic wind power forecasting based on Markov chain models," 11th international Conference on Probabilistic Methods Applied to Power Systems, IEEE, Jun. 2010.

S. Asmussen, "Markov Chains," Applied Probability and Queues, New York: Springer, pp. 3-38, 2003.

IBM, "CART Algorithm," Aug. 27, 2004, [Online]. Available: ftp://ftp.boulder.ibm.com/software/analytics/spss/support/Stats/Docs/Statistics/Algorithms/14.0/TREE-CART.pdf.

J. Dowell, P. Pinson, "Very-Short-Term Probabilistic Wind Power Forecasts by Sparse Vector Autoregression," IEEE Transactions on Smart Grid, vol. 7, No. 2, pp. 763-770, 2016.

\* cited by examiner

INDUCED MARKOV CHAIN FOR WIND FARM GENERATION FORECASTING

CROSS-REFERENCE TO RELATED APPLICATION

This application claims priority to, and the benefit of, U.S. Provisional Application Ser. No. 62/727,827 filed on Sep. 6, 2018, and entitled "INDUCED MARKOV CHAIN FOR WIND FARM GENERATION FORECASTING". The above application is hereby incorporated by reference in its entirety.

FEDERALLY SPONSORED RESEARCH OR DEVELOPMENT

This invention was made with government support under DE-AR0000696 awarded by the Department of Energy and under HDTRA1-13-1-0029 awarded by the Defense Threat Reduction Agency. The government has certain rights in the invention.

TECHNICAL FIELD

The present disclosure relates to forecasting, and in particular to short term forecasting of wind farm power generation.

BACKGROUND

In power systems, wind turbines generate power based on the current wind speed. Therefore, unlike conventional generating units, wind turbines cannot change their output upon request. This causes substantial uncertainty during power system operation. Using a wind power output forecast allows system operators to manage this uncertainty. Accordingly, improved forecasting systems and methods are desirable.

SUMMARY

Systems, methods, and devices for very short-term wind power forecasting using an induced Markov chain (IMC) model are provided. Markov chain models have extremely low computational complexity and may be capable of producing point and non-parametric distributional forecasts. The IMC is a Markov chain that is focused on modeling the difference process of measured power output data. The change in state definitions to a difference process may create a much smaller state space and provide a more stationary process compared to other Markov chain model setups. The IMC may be represented by a transition matrix. The transition matrix may be derived from the state-to-state transitions that occur in a training set. The IMC model may be applied to real world data from wind farms and may show up to 20% lower root mean squared error compared to persistence forecasting. In an exemplary embodiment, training may be performed with past aggregate power output measurements, for example, past aggregate power output measurements from a previous year, e.g., in 5 and 10-minute ahead forecasts. Other short-term forecasts may also be used.

In an exemplary embodiment, a method for forecasting power generation in a wind farm includes utilizing, by a processor, an induced Markov chain model to generate a forecast of power generation of the wind farm. The forecast may be at least one of a point forecast or a distributional forecast. The method further includes modifying at least one of (i) a generation of electricity at a power plant coupled to a common power grid as the wind farm or (ii) a distribution of electricity in the common power grid based on the forecast of power generation of the wind farm.

In an exemplary embodiment, a device for forecasting power generation in a wind farm includes a processor configured to be in electrical communication with a wind farm power output sensor. The processor is configured to utilize an induced Markov chain model to generate a forecast of the power generation of the wind farm. The forecast is at least one of a point forecast or a distributional forecast. The processor is further configured to modify at least one of (i) a generation of electricity at a power plant coupled to a common power grid as the wind farm or (ii) a distribution of electricity in the common power grid based on the forecast of the power generation of the wind farm.

In an exemplary embodiment, a system for forecasting power generation in a wind farm includes a wind farm power output sensor and a processor. The processor is configured to be in electrical communication with the wind farm power output sensor. The processor is further configured to utilize an induced Markov chain model to generate a forecast of the power generation of the wind farm. The forecast is at least one of a point forecast or a distributional forecast. The processor is configured to modify at least one of (i) a generation of electricity at a power plant coupled to a common power grid as the wind farm or (ii) a distribution of electricity in the common power grid based on the forecast of the power generation of the wind farm.

The contents of this summary section are intended as a simplified introduction to the disclosure and are not intended to limit the scope of any claim.

BRIEF DESCRIPTION OF THE DRAWINGS

With reference to the following description, appended claims, and accompanying drawings:

DETAILED DESCRIPTION

Figure 1:
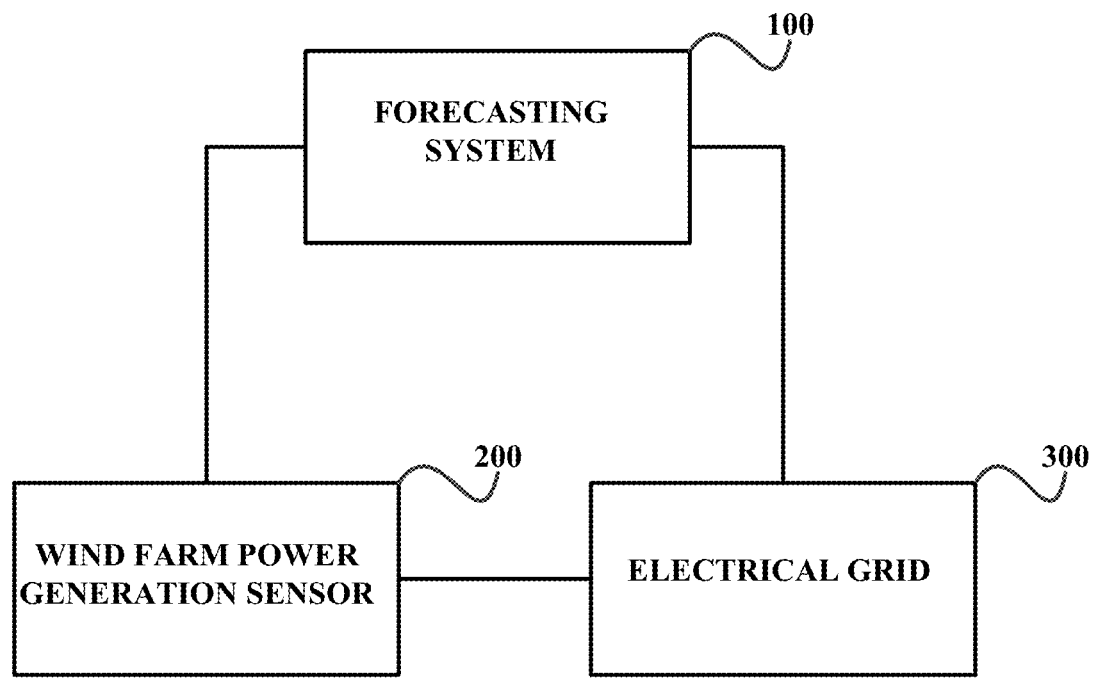
FIG. 1 illustrates a system for wind power generation forecasting in accordance with an exemplary embodiment.

The following description is of various exemplary embodiments only and is not intended to limit the scope, applicability, or configuration of the present disclosure in any way. Rather, the following description is intended to provide a convenient illustration for implementing various embodiments, including the best mode. As will become apparent, various changes may be made in the function and arrangement of the elements described in these embodiments without departing from the scope of principles of the present disclosure.

For the sake of brevity, conventional techniques for computer modeling, including spatial and/or temporal analysis, may not be described in detail herein. Furthermore, the connecting lines shown in various figures contained herein are intended to represent exemplary functional relationships and/or physical couplings between various elements. It should be noted that many alternative or additional functional relationships or physical connections may be present in a practical wind power generation forecasting system.

Prior approaches to wind farm power generation forecasting suffer from various deficiencies; these result in limited forecast accuracy. Accordingly, baseline electrical generation capacity (e.g., coal, nuclear, gas, hydroelectric, etc.) may either over- or under-produce when estimated wind power generation contributions to the grid are accounted for. Stated another way, uncertainty associated with wind farm power generation levels can result in burning of excess fossil fuels and release of attendant excess greenhouse gases if the grid contribution from wind power is underestimated; moreover, additional electricity may need to be purchased at higher spot market prices if wind power contributions are overestimated. In sum, forecasts of limited accuracy lead to economic and environmental inefficiencies. In contrast, principles of the present disclosure provide an improved forecasting capability.

Innovative methods disclosed herein can be used to forecast wind power outputs over some look-ahead horizon, for example between a few seconds and about 6 hours ahead. In this forecasting horizon, present industry practice is to use only a persistence forecast (forecasting the future value to be the same as the value now). Persistence is used because statistical forecasting methods were found to be impractical to implement, requiring the attention of an expert to tune and maintain a model for each wind farm. In contrast, an exemplary induced Markov chain model can generate high-quality forecasts and can be tuned using a completely automatic procedure which does not require the attention of an expert.

Nomenclature as Used Herein:

$n_{ij}$ The number of transitions to $S_j$ from $S_i$ in the training set.

$n_{ijh}$ The number of transitions to $S_j$ (in $S_k$) from $S_i$ (in $S_o$) and $S_h$ (in $S_p$) in the training set.

$N_k$ The number of states in $S_k$.

$N_o$ The number of states in $S_o$.

$N_P$ The number of states in $S_P$.

$O_F$ The factor determining the number of overlapping states in $S_o$.

P Wind farm generation level.

$P_{ag}^{max}$ Maximum aggregate power output of the wind farm.

$P_{ag}^{min}$ Minimum aggregate power output of the wind farm.

Q The transition matrix for a Markov chain.

$S_k$ A state set in the induced Markov chain state space representing changes in generation level.

$S_o$ A state set in the induced Markov chain state space representing changes in generation level.

$S_P$ A state set in the induced Markov chain state space representing generation level.

t The time index of measurement data.

$W_k$ The width of a state in $S_k$.

$W_o$ The width of a state in $S_o$.

$\Delta$ A change in generation level, $\Delta(t)=P(t)-P(t-1)$ $\Delta_k^{max}$ The most positive change in generation level represented in $S_k$.

$\Delta_k^{min}$ The most negative change in generation level represented in $S_k$.

$\Delta_o^{max}$ The most positive change in generation level represented in $S_o$.

$\Delta_o^{min}$ The most negative change in generation level represented in $S_o$.

With reference now to FIG. 1, in an exemplary embodiment a forecasting system 100 may be coupled to a wind farm power generation sensor 200, an electrical grid 300, or both the wind farm power generation sensor 200, and the electrical grid 300. Via wind farm power generation sensor 200, forecasting system 100 may receive information regarding current wind farm power generation, historical wind farm power generation, both current wind farm power generation and historical wind farm power generation, and/or other information, such as meteorological information, for example. Forecasting system 100 may be coupled to an electrical grid 300 to control the electrical grid 300, coupled to an electrical grid 300 to provide information to operators thereof, or coupled to an electrical grid 300 to control the electrical grid 300 and to provide information to operators thereof. Forecasting system 100 may include various processors, software programs, computing components, some combination of various processors, software programs, computing components, or the like. Forecasting system 100 may be operable to execute various exemplary forecasting methods, for example, methods disclosed herein.

A Markov process is a stochastic process that satisfies the Markov property. The Markov property is satisfied if future predictions about the process, made solely from knowing the present state of the process, are just as accurate as predictions made knowing the process' entire history. A Markov chain, applicable to wind power forecasting, is a Markov process that has a finite discrete state space (representing wind farm output) and a discrete index set (representing time). If a Markov chain includes N states, then the probability of transferring from any state to any other state can be represented by the N by N transition matrix Q. The ith-jth element of Q contains the probability of transitioning to state j from state i. The transition matrix Q can be computed as $$Q_{i,j} = \frac{n_{ij}}{\sum_{k=1}^{N} n_{ik}}, i, j \in (1, \ldots, N), \quad (1)$$

where n is the number of times a specific transition occurred in the training set. An example transition matrix for a Markov chain with five states is illustrated in Table 1. The example transition matrix of Table 1 represents the state space of a Markov chain with five states, where S(t) represents the state at time t, and $Pr_{ij}$ represents the probability of transferring to state j from state i.

TABLE 1

|  |  | S(t + 1) | | | | |
|---|---|---|---|---|---|---|
|  |  | $S_1$ | $S_2$ | $S_3$ | $S_4$ | $S_5$ |
| S(t) | $S_5$ | $Pr_{51}$ | $Pr_{52}$ | $Pr_{53}$ | $Pr_{54}$ | $Pr_{55}$ |
|  | $S_4$ | $Pr_{41}$ | $Pr_{42}$ | $Pr_{43}$ | $Pr_{44}$ | $Pr_{45}$ |
|  | $S_3$ | $Pr_{31}$ | $Pr_{32}$ | $Pr_{33}$ | $Pr_{34}$ | $Pr_{35}$ |
|  | $S_2$ | $Pr_{21}$ | $Pr_{22}$ | $Pr_{23}$ | $Pr_{24}$ | $Pr_{25}$ |
|  | $S_1$ | $Pr_{11}$ | $Pr_{12}$ | $Pr_{13}$ | $Pr_{14}$ | $Pr_{15}$ |

Historical measurements of wind farm power generation are continuous values that lie somewhere between the minimum and maximum rated wind farm power. A major challenge of Markov chain design is to transform the continuous power output measurements into discrete states that define the Markov chain state space. In an example setup, the Markov chain states are defined as some interval of the wind farm generation output where the Markov chain has finite states and the state $S_k$ (k=1, ..., N) corresponds to a specific range of generation levels [$P_k$, $P_{k+1}$), with $P_1 = P_{ag}^{min}$ and $P_{N+1} = P_{ag}^{max}$. In an exemplary embodiment, the setup creates a very large state space. The Markov chain model may be applied to data from a 300.5 MW wind farm, e.g., in Colorado. The 300.5 MW wind farm may make 10-minute ahead forecasts. The mean absolute error (MAE) for one year of persistence forecasts using the data set is approximately 6 MW. For the Markov model to improve upon persistence, the width of each state in the model may be significantly smaller than 6 MW. Thus, the Markov model may have at least 100 states and a transition matrix with 10,000 cells. However, one year of past data measured every 10 minutes contains only 52,560 samples. An example may use non-uniform state spacing but uniform level crossing rate (LCR). In other words, the distances between states may vary while the LCR may remain the same. In an exemplary embodiment, the sections of generation level with higher LCR may have a larger spacing of states than areas with lower LCR. In some cases, the Markov chain point forecast does not improve upon a persistence forecast.

Modeling the Difference Process

An exemplary disclosed Markov chain model deviates from another setup by defining states based on the difference process of the original power output data; hence, the Markov chain model defining states based on the difference process of the original power output data may be denoted as the induced Markov chain (IMC) model. The difference process being the time series created when the difference between adjacent power output measurements is computed from the historical wind power measurements. Using wind speed measurements, the use of differenced data may allow for superior capturing of the correlation between adjacent wind speed measurements used for probabilistic model data generation. The difference process is far more stationary and can be modeled by a much smaller state space.

Figure 2:
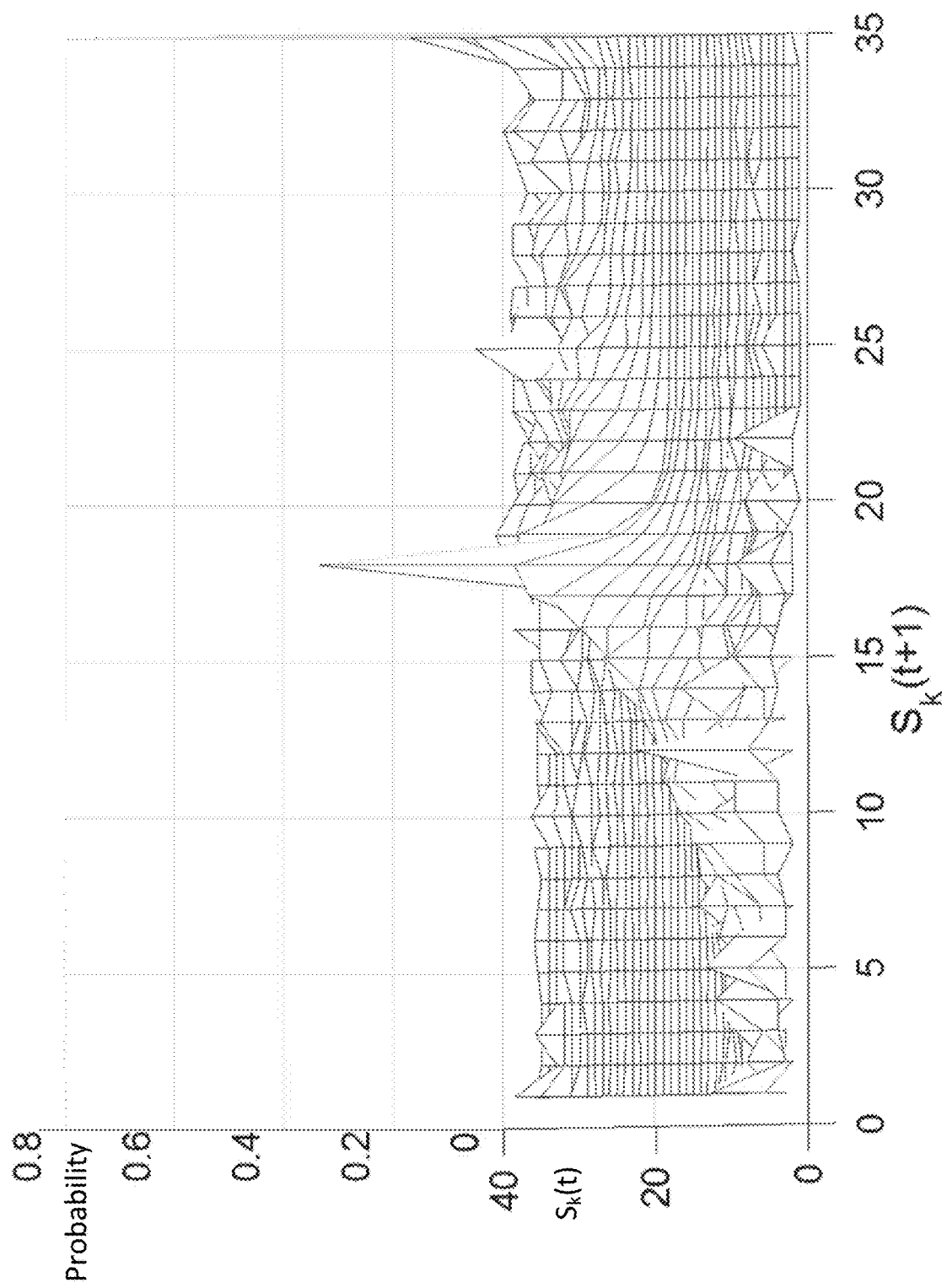
FIG. 2 illustrates an exemplary induced Markov chain (IMC) model transition matrix using one year of wind farm data with $N_k=35$, $\Delta_k^{min}=-60$ MW, and $\Delta_k^{max}=60$ MW in accordance with an exemplary embodiment.

One possible IMC setup has finite states where the state $S_k$ (k=1, ..., $N_k$) corresponds to a specific interval of change in generation level [$\Delta_k, \Delta_{k+1}$), with $\Delta_1 = \Delta_k^{min}$ and $\Delta_{N_k+1} = \Delta_k^{max}$. The induced Markov chain is discrete-time and of order 1. The values of $\Delta_1$ to $\Delta_{N_k}$ are known once $\Delta_k^{min}$, $\Delta_k^{max}$ and $N_k$ are chosen. The transition matrix can then be computed using equation (1). FIG. 2 illustrates a transition matrix using $N_k$=35, $\Delta_k^{min}$=60 MW, $\Delta_k^{max}$=60 MW created using the 2009, 10-minute wind farm data from a 300.5 MW wind farm in Colorado.

FIG. 2 illustrates that there is a clear relationship between the change in power that was just observed and the change in power that will appear next. This relationship can be exploited for improved wind power forecasting. Each row in FIG. 2 contains a histogram, which is used as a nonparametric distributional forecast, and the mean of that distribution acts as the point forecast.

Overlapping States

Error is introduced when continuous power output measurements are transformed into discrete states. For example, in FIG. 2, state 18 is defined as any change in power between −1.714 MW and +1.714 MW. Naturally, state 18 best approximates the transition behavior of a change of 0 MW because 0 MW lies in the center of the state interval. However, this approximation is also used to find the transition behavior for a change of +1.713 MW and −1.713 MW. To improve this approximation, another state called state 18' can be defined as any change in power from +3.427 MW and −0.001 MW (centering a change of +1.713 MW within the state interval). State 18' would be a much better approximation than state 18 for a change in power of +1.713 MW. Also, a state called state 18" can be defined as any change in power from 0.001 MW to −3.427 MW. State 18" would be a much better approximation than state 18 for a change in power of −1.713 MW. However, this would cause state 18' and state 18" to overlap with other states. This idea can be referred to as using overlapping states. Continuing, an infinite number of states can be defined that center every possible change in power within the state space to minimize the discretization error. It may be desired that the forecasting algorithms complete all training offline, before forecasting begins, to minimize computation time during online operation. However, an infinite number of states would require an infinite number of distributions being saved a priori, which is not possible. Therefore, in practical applications, only a large number of overlapping states should be used to both limit discretization error and reduce computation time.

Using overlapping states requires the Markov chain to use two different sets of states using different definitions, $S_k$ and $S_o$. $S_k$ has the same definition as used in the example in FIG.

2. $S_k$ cannot have overlapping states because this state set is used to create a histogram within each row of the transition matrix. In Table 1, $S_k$ would be used in the S(t+1) dimension of the transition matrix. $S_o$ (o=1, ..., $N_o$) corresponds to a specific interval of change in generation level [$\Delta_o$, $\Delta_{o+1}$), with $\Delta_1 = \Delta_o^{min}$ and $\Delta_{N_o+1} = \Delta_o^{max}$. $S_o$ can contain overlapping states but has the same state spacing as $S_k$. The width of each state $W_o$ can be found as, $$W_k = W_o = \frac{(\Delta_k^{max} - \Delta_k^{min})}{N_k}. \quad (2)$$

Figure 3:
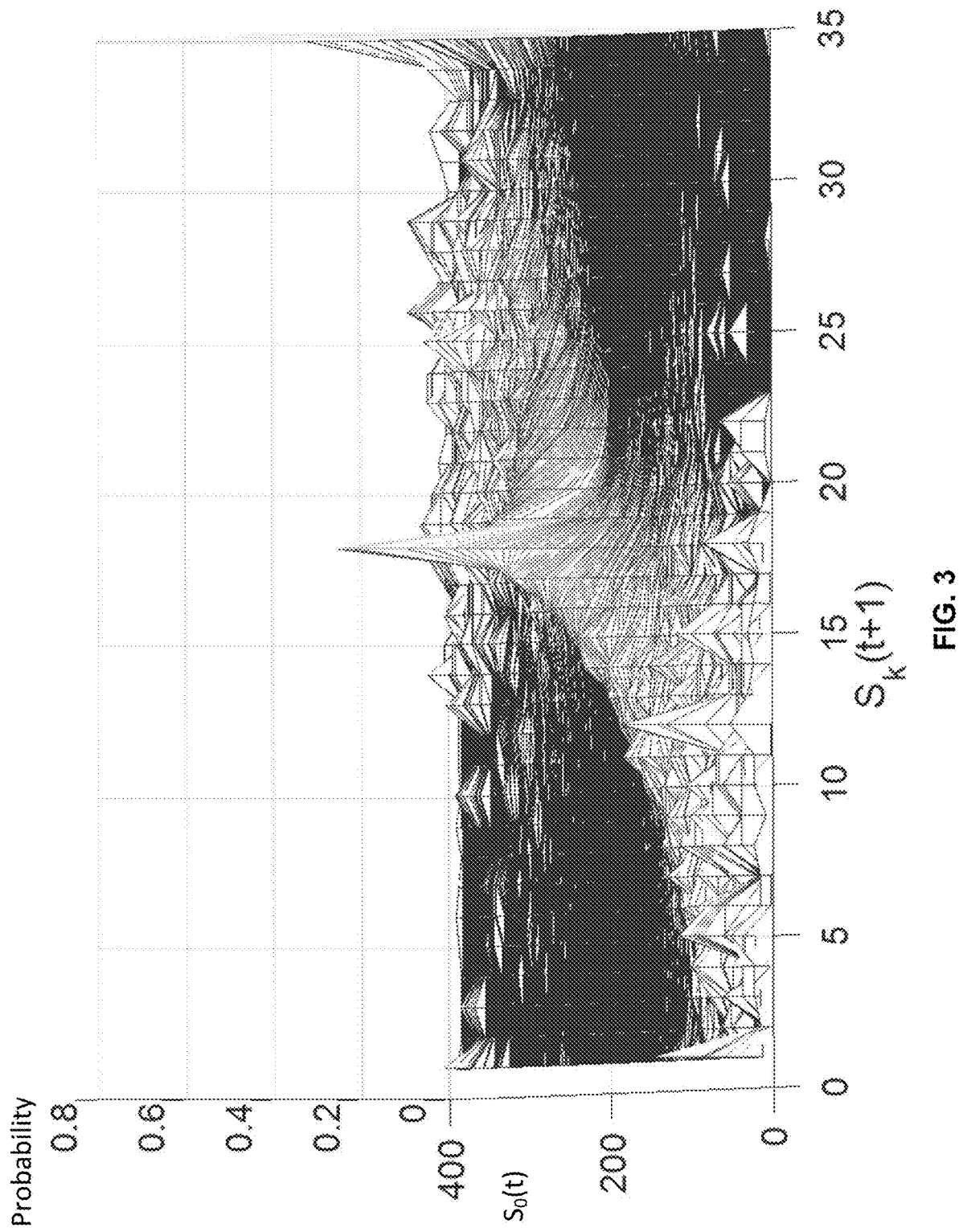
FIG. 3 illustrates an exemplary IMC model transition matrix using one year of wind farm data with $N_k=35$, $\Delta_k^{min}=-60$ MW, $\Delta_k^{max}=60$ MW, $N_o=385$, $\Delta_o^{min}=-60$ MW, and $\Delta_o^{max}=60$ MW in accordance with an exemplary embodiment.

$N_o$ and $N_k$ are related by the overlap factor $O_F$ as $N_o = O_F N_k$. $S_o$ will contain overlapping states if $O_F > 1$. In Table 1, $S_o$ would be used in the S(t) dimension to increase the number of descriptions available of an observed change in power in the transition matrix. An observed change in power may fall into multiple states in $S_o$ but the state whose center is closest to the observed change in power would be the best approximation. This is the state that would be used during forecasting. FIG. 3 illustrates a transition matrix identical to that of FIG. 2 but with 11 times as many states in $S_o$ than in $S_k$ ($O_F = 11$). The additional states in $S_o$ reduce the discretization error within the model.

Figure 4:
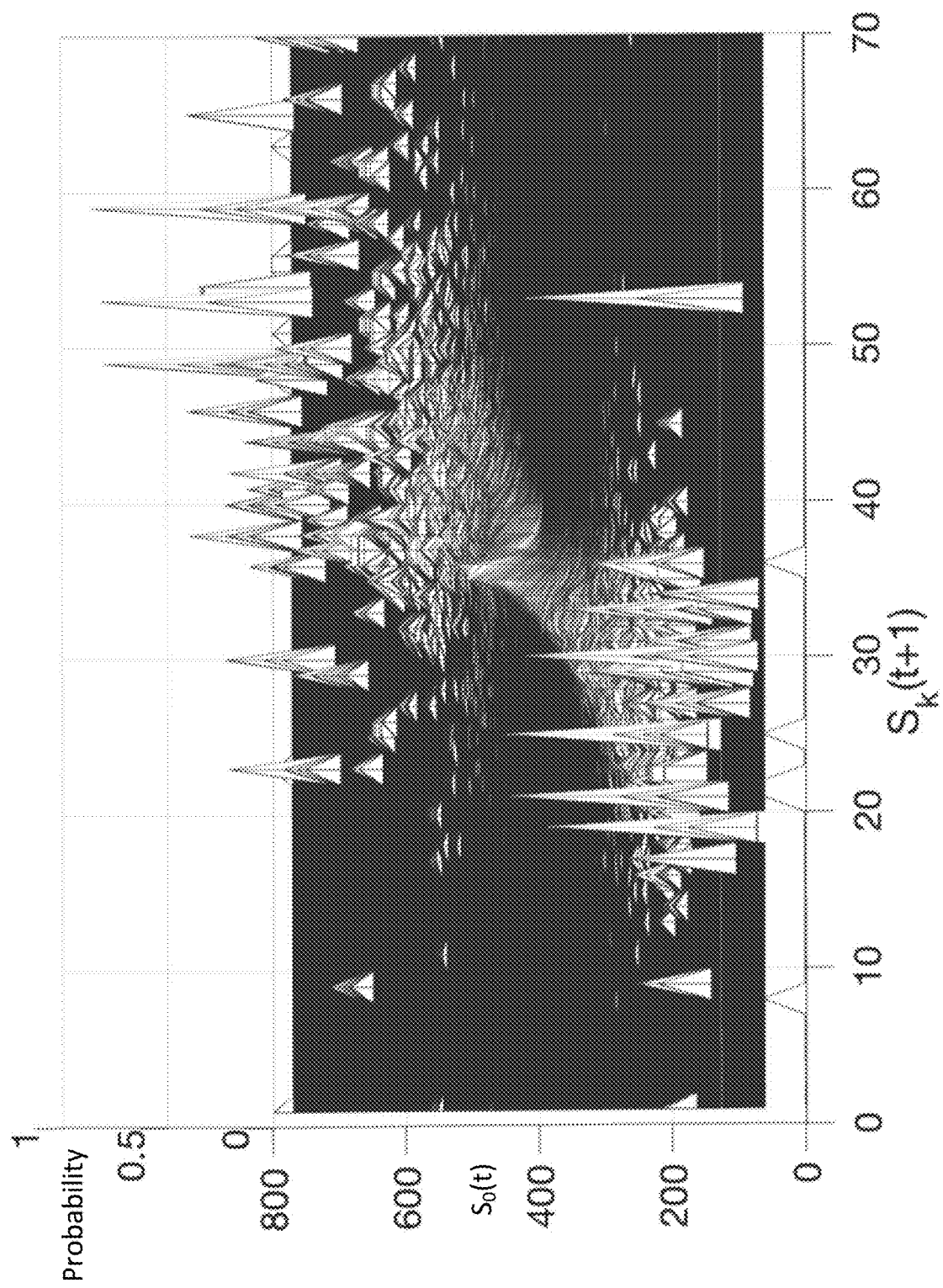
FIG. 4 illustrates an exemplary IMC model transition matrix using one year of wind farm data with $N_k=70$, $\Delta_k^{min}=-120$ MW, $\Delta_k^{max}=120$ MW, $N_o=770$, $\Delta_o^{min}=-120$ MW, and $\Delta_o^{max}=120$ MW in accordance with an exemplary embodiment.

If $\Delta_o^{min}$, $\Delta_o^{max}$, $\Delta_k^{min}$ and $\Delta_k^{max}$ are selected to be too large, the transition matrix may contain rows with very few or no measurements. These rows would be insufficient for forecasting. FIG. 4 illustrates a transition matrix identical to that of FIG. 3 but with twice the range and twice the number of states.

FIG. 4 illustrates that many rows at the bottom and top of the transition matrix have very few or no measurements. Better values for $\Delta_o^{min}$ and $\Delta_o^{max}$ can be found by considering the number of measurements in each row of the transition matrix and constraining $S_o$ to only the states that contain more measurements than some threshold value. In an exemplary embodiment, any state with at least 40 measurements may be kept in the model, the rest of the states, e.g., states with less than 40 measurements, may be removed. Any measurement that falls outside this region is not left out of the model but simply relocated to the closest remaining state. As a result, the induced Markov chain model transition matrix is computed as $$Q_{i,j} = \frac{n_{ij}}{\sum_{m=1}^{N_k} n_{im}}, \quad (3)$$

$$i \in (N_o^{min}, \ldots, N_o^{max}),$$

$$j \in (1, \ldots, N_k),$$

where $N_o^{min}$ and $N_o^{max}$ correspond to the most negative state and the most positive state that still meet the required number of measurements, respectively.

Sections for Generation Levels

Figure 5:
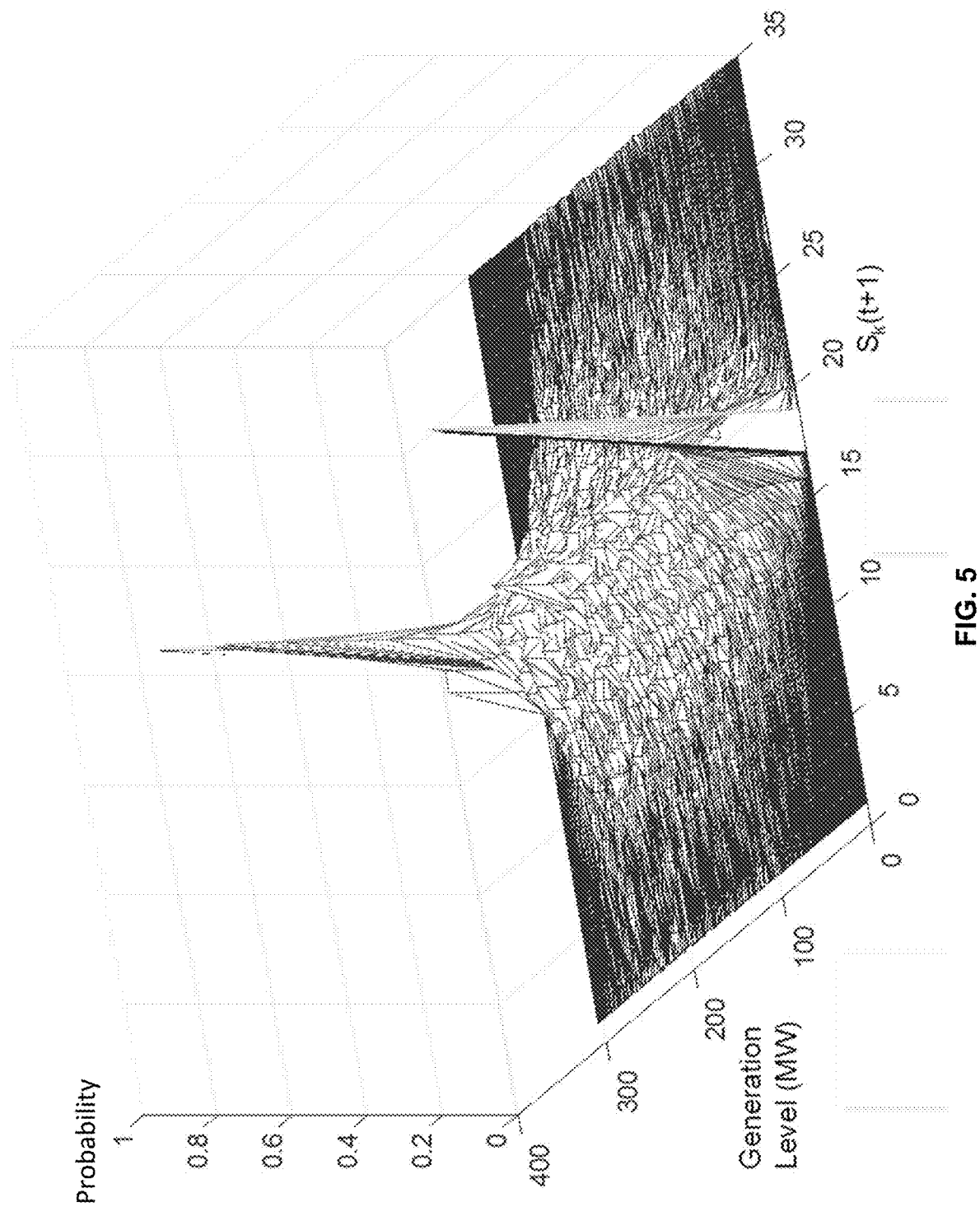
FIG. 5 illustrates an exemplary change in power expected at a given generation level using one year of wind farm data $N_k=35$, $\Delta_k^{min}=-60$ MW, and $\Delta_k^{max}=60$ MW in accordance with an exemplary embodiment.

When modeling the difference process, it will be noted that the transition behavior changes as the level of generation approaches the wind farm minimum or maximum power output. FIG. 5 illustrates the expected change in power at a given generation level using one year of wind farm data from the 300.5 MW wind farm in Colorado.

FIG. 5 illustrates that the difference process changes dramatically as the level of generation approaches either limit of the wind farm. However, the distributions are very consistent away from these limits. To account for this behavior, the level of generation is included in the WIC model. A third state set $S_P$ is used in the IMC state space. $S_P$ (P=1, ..., $N_P$) corresponds to a specific interval of generation level [$P_P$, $P_{P+1}$), with $P_1 = P_{ag}^{min}$ and $P_{N_P} = P_{ag}^{max}$. $S_P$ does not have uniform state spacing and becomes defined when $N_P$ and $P_2$ through $P_P$ are selected. The induced Markov chain transition matrix Q can then be computed as $$Q_{i,j,h} = \frac{n_{ijh}}{\sum_{m=1}^{N_k} n_{imh}}, \quad (4)$$

$$i_h \in (N_{o_h}^{min}, \ldots, N_{o_h}^{max}),$$

$$j \in (1, \ldots, N_k),$$

$$h \in (1, \ldots, N_P).$$

In this description, three sections of generation levels are used to account for the changing behavior of the difference process $N_P = 3$, however, more could be used if sufficient data is available for training. Notice in equation (3) that i may have different minimum and maximum states for every h in the model because the quantity of data in each section will likely be different.

The State Space of the Induced Markov Chain Model

The IMC has finite states that can be divided into three sets $S_o$, $S_k$, and $S_P$.

$S_k$ (k=1, ..., $N_k$) corresponds to a specific interval of change in generation level [$\Delta_k$, $\Delta_{k+1}$), with $\Delta_1 = \Delta_k^{min}$ and $\Delta_{N_k+1} = \Delta_k^{max}$. $S_k$ has uniform state spacing and no overlapping states and becomes defined once $\Delta_k^{min}$, $\Delta_k^{max}$, and $N_k$ are selected.

$S_o$ (o=1, ..., $N_o$) corresponds to a specific interval of change in generation level [$\Delta_o$, $\Delta_{o+1}$), with $\Delta_1 = \Delta_o^{min}$ and $\Delta_{N_o+1} = \Delta_o^{max}$. $S_o$ can contain overlapping states but has the same state spacing as $S_k$. The width of each state $W_o$ can be found using equation (2). $N_o$ and $N_k$ are related by the overlap factor $O_F$ as $N_o = O_F N_k$.

$S_P$ (P=1, ..., $N_P$) corresponds to a specific interval of generation level [$P_P$, $P_{P+1}$), with $P_1 = P_{ag}^{min}$ and $P_{N_P} = P_{ag}^{max}$. $S_P$ does not have uniform state spacing and becomes defined when $N_P$ and $P_2$ through $P_P$ are selected.

The IMC state space becomes defined once $\Delta_k^{min}$, $\Delta_k^{max}$, $N_k$, $O_F$, $N_P$ and $P_2$ through $P_P$ are selected. The transition matrix Q can then be computed using equation (4). This method will produce forecasts over different horizons depending on the data used during training. If 10-minute data is used during training, then a t+1 (1 step ahead) forecast will produce a 10-minute ahead forecast. A t+n (n steps ahead) forecast can be used to forecast further ahead. Apply the forecast in the range of a few seconds to about 6 hours ahead may be feasible depending on the data used.

Automatic Parameter Selection

Figure 6:
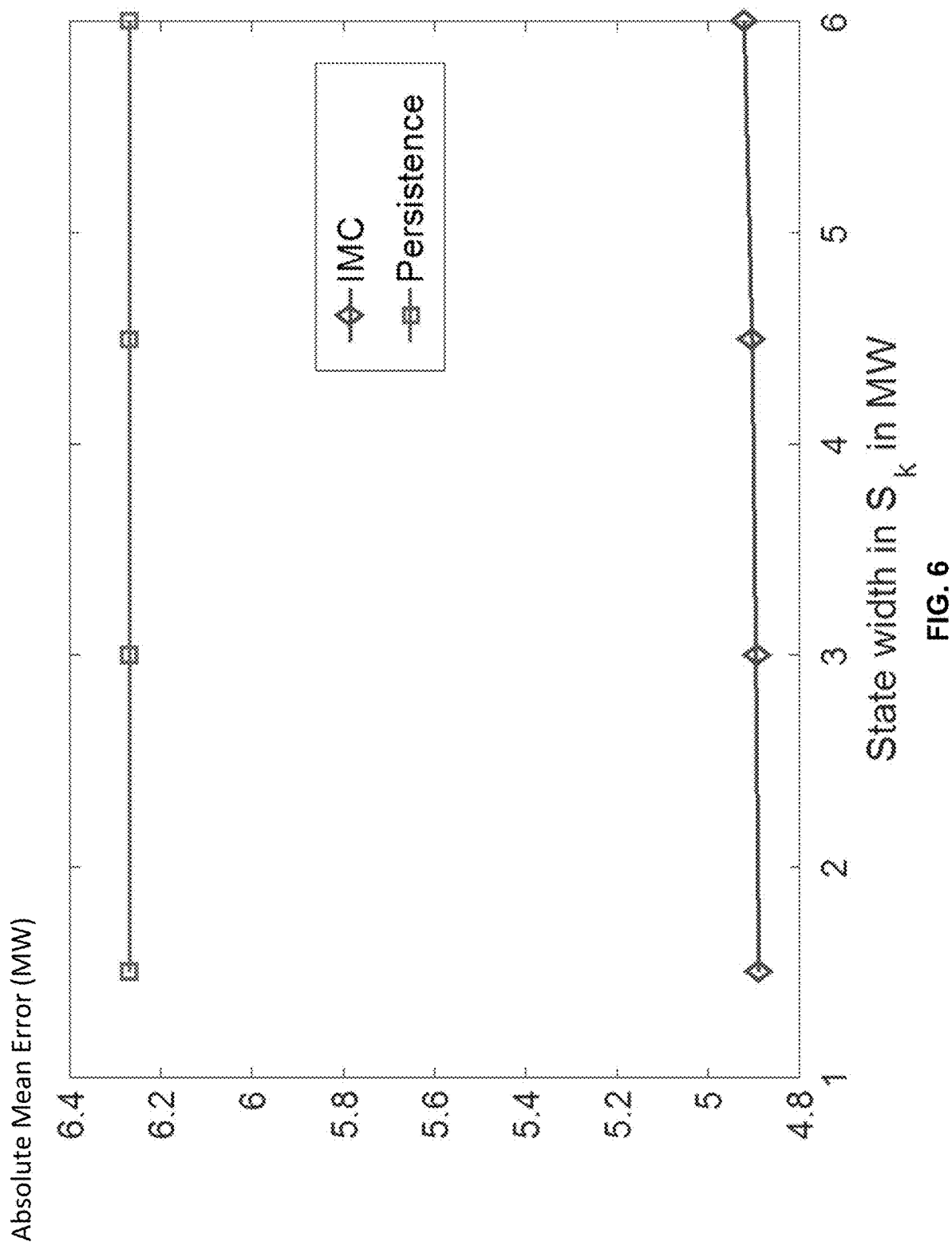
FIG. 6 illustrates mean absolute errors for one year of 10-minute ahead forecasts for an exemplary IMC model compared to a persistence forecast using different initial state widths in $S_k$ in accordance with an exemplary embodiment.

The IMC model can be tuned using a systematic, iterative search procedure. This section details this procedure using the 2009 Colorado wind farm data as an example. The maximum aggregate power for the wind farm is $P_{ag}^{max} = 300.5$ MW and the minimum aggregate power is $P_{ag}^{min} = -7$ MW. To begin, $S_k$ must be defined by selecting $\Delta_k^{min}$, $\Delta_k^{max}$ and $N_k$. The parameters $\Delta_k^{min}$ and $\Delta_k^{max}$ can be selected by choosing values that contain all, or nearly all, of the training data. For this example, a value of $-\Delta_k^{min} = \Delta_k^{max} = 102.5$ MW was chosen, as 99.94% of the data lie within this range. Once $\Delta_k^{min}$ and $\Delta_k^{max}$ are selected, the parameter $N_k$ determines the width of each state in $S_k$. $N_k$ can be selected from some fraction of the mean absolute error using a persistence forecast on the data being used. A persistence forecast will produce an MAE of approximately 6 MW using one year of data from the Colorado wind farm. FIG. 6 illustrates the induced Markov chain performance using different state widths ranging from 1.5 MW to 6 MW (25% to 100% persistence MAE).

FIG. 6 illustrates that the IMC model is not very sensitive to state widths within this range. A value of $N_k=67$ was selected in this example. This corresponds to state widths of approximately 50% persistence MAE. In general, state widths can be selected as approximately equal to 50% MAE for a persistence forecast of the training data set.

Figure 7:
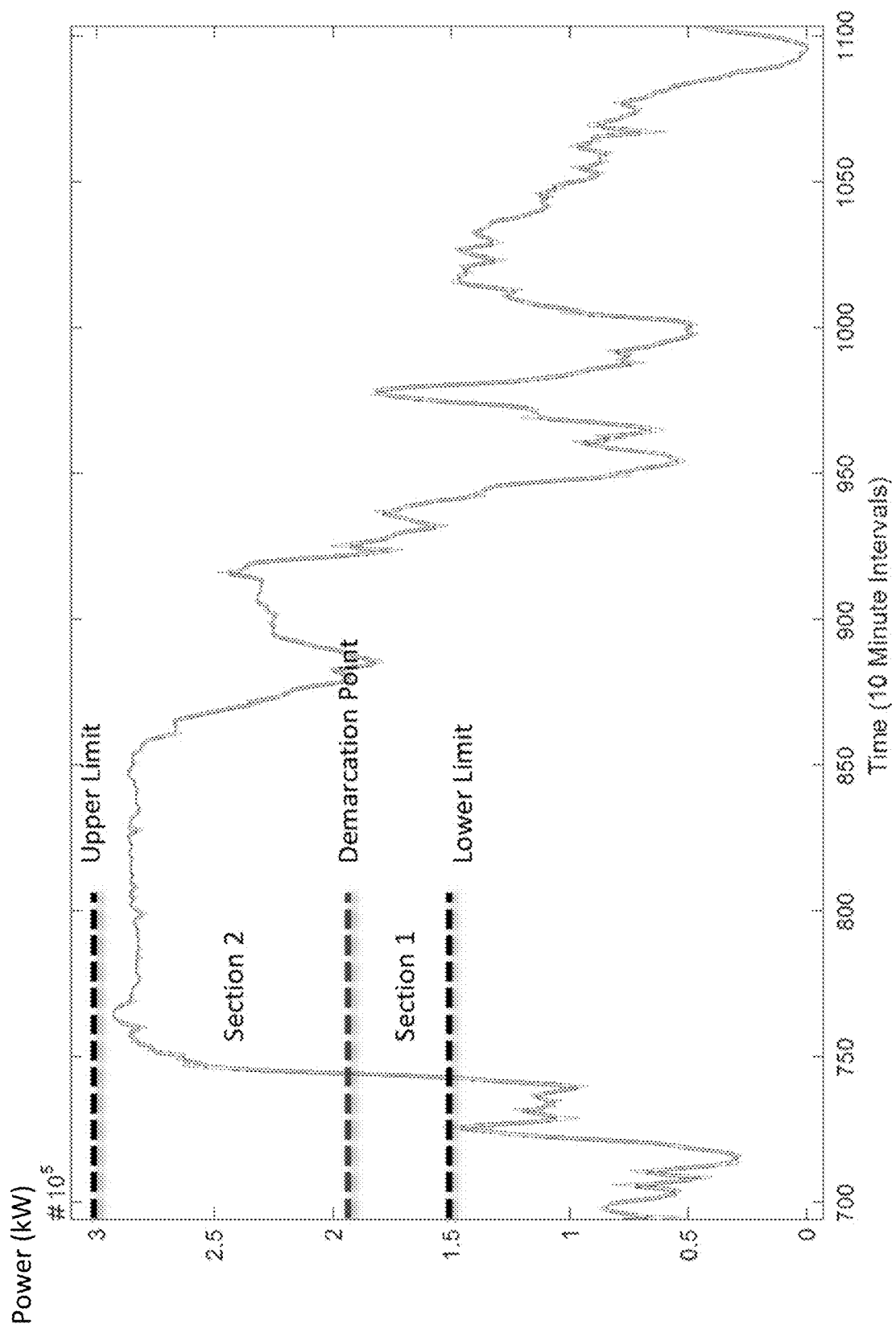
FIG. 7 illustrates a portion of wind farm measurements depicting how $P_2$ is determined in accordance with an exemplary embodiment.
Figure 8:
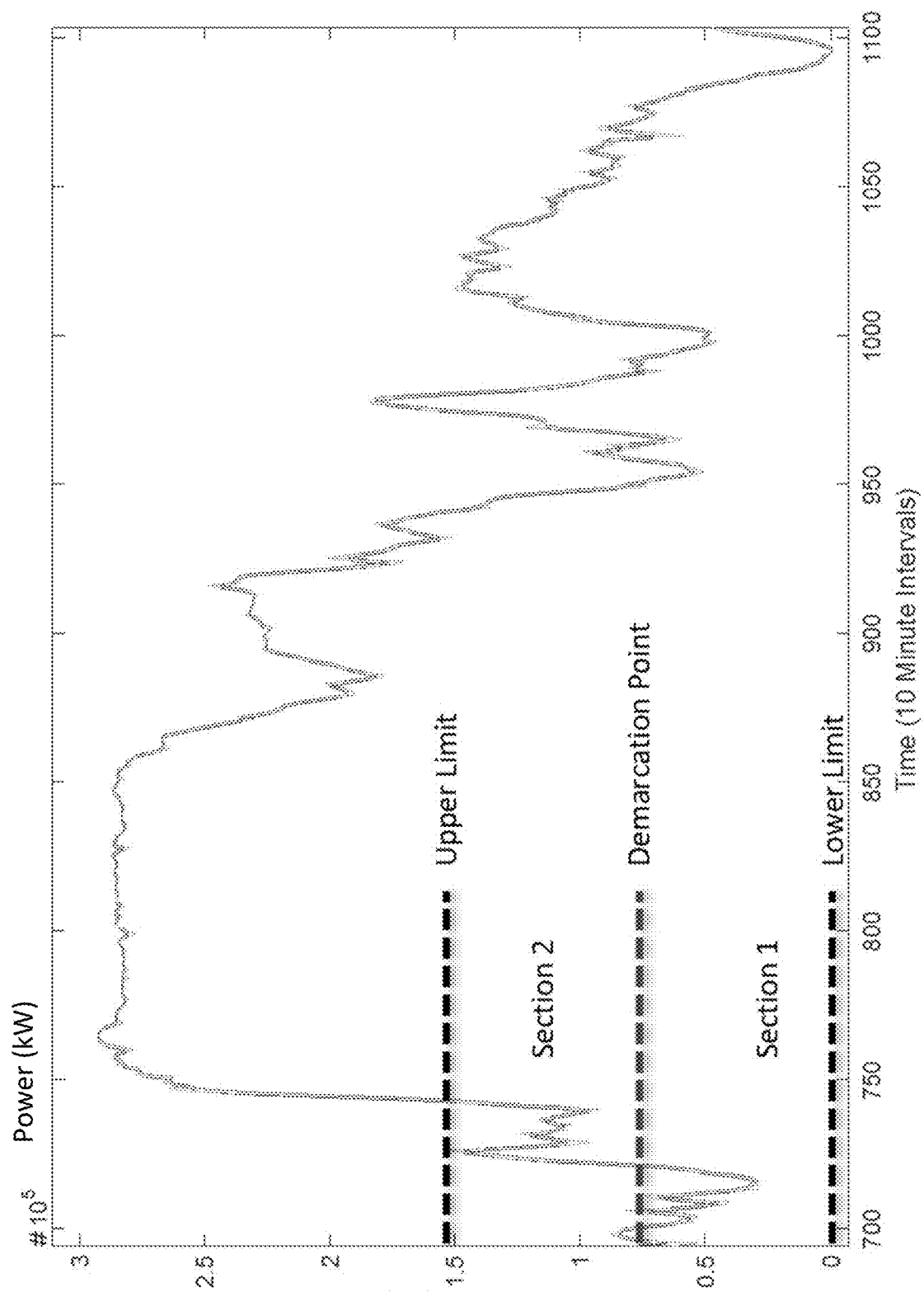
FIG. 8 illustrates a portion of wind farm measurements depicting how $P_3$ is determined in accordance with an exemplary embodiment.
Figure 9:
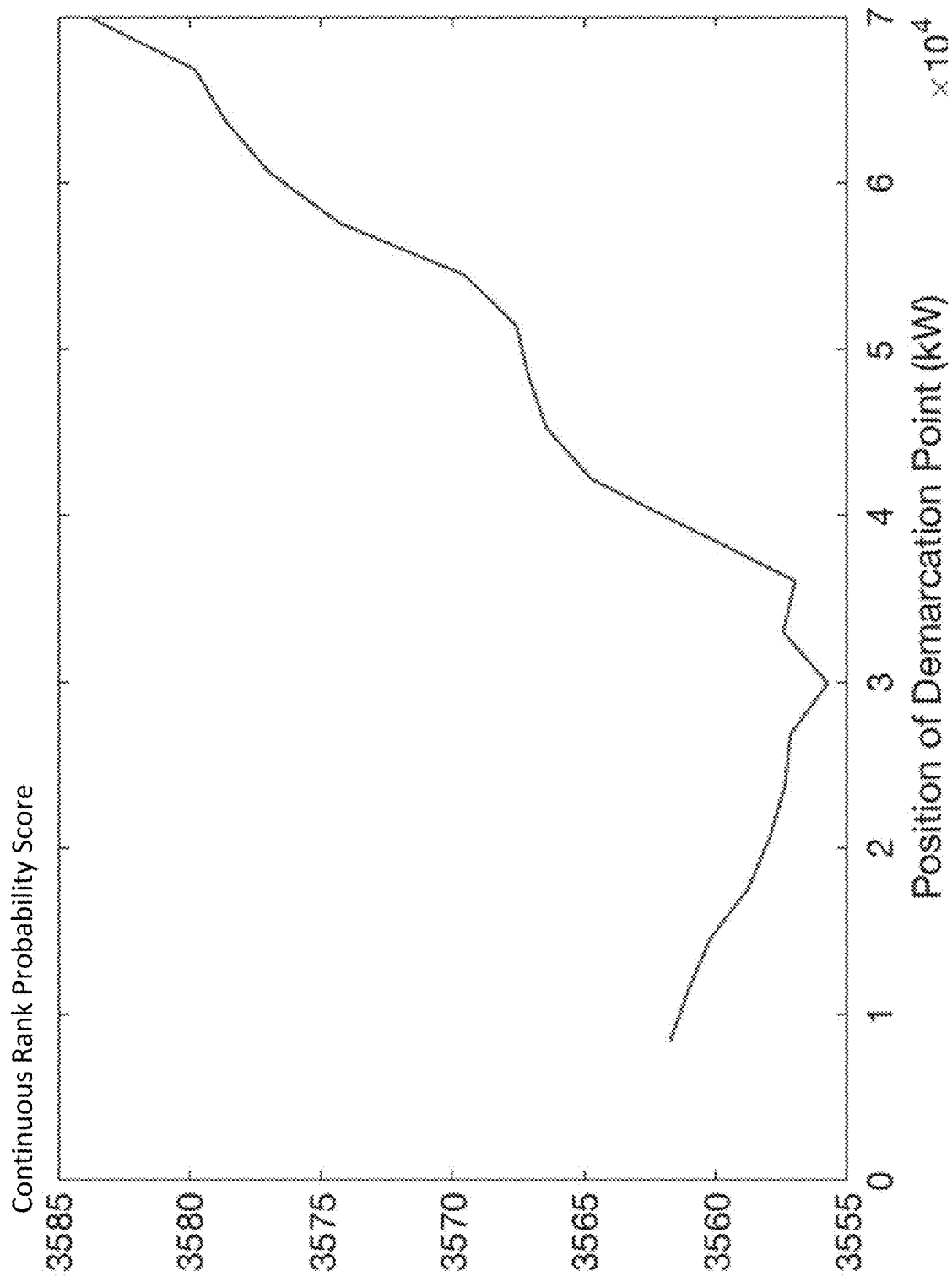
FIG. 9 illustrates continuous rank probability scores recorded when searching for $P_2$ using the 2009 Colorado 300.5 MW dataset in accordance with an exemplary embodiment.

Once $S_k$ is defined, $N_P$ and $P_2$ through $P_P$ must be selected to define $S_P$. Recall from before that $N_P=3$, $P_1=P_{ag}^{min}$, and $P_{P+1}=P_{ag}^{max}$. This leaves the selection of $P_2$ and $P_3$, which determine the boundary between the 3 sections of generation levels within the model. These thresholds are found, one at a time, using an iterative search. The generation range of the wind farm is first divided into two equal parts so that $P_2$ can be found independently of $P_3$. The midway point in the wind farm range is 146.75 MW. The algorithm then considers the best way to divide the upper half (146.75 MW to 300.5 MW) into two parts. To determine the best way to divide the upper half into two parts, the algorithm conducts a series of forecasts. Only the data from 146.75 MW to 300.5 MW is considered. A demarcation point is then set that breaks the upper half of the wind farm range into two sections. Both sections are modeled by an IMC with a transition matrix defined by equation (3). Each model only models and forecasts the data that lies within its respective generation level. The models are trained using 2009 measured data and also tested on the same 2009 data (in practice, future data is not available during parameter selection). The continuous rank probability score (CRPS) for the year of forecasts is recorded. The demarcation point is moved, and the forecast is repeated. The demarcation point that gives the lowest CRPS is selected as the threshold parameter. FIGS. 7 and 8 illustrate how these parameters are found. FIG. 9 illustrates the CRPS recorded when searching for $P_2$ using the 2009 Colorado wind farm data. FIG. 9 illustrates that the best performance is achieved when $P_2=29.9$ MW. $P_3$ was found to be 269.7 MW.

Finally, $S_o$ can be defined by selecting $O_F$. This determines the number of overlapping states in $S_o$. In this example, $O_F=11$. Anything beyond this choice would have little benefit but simply increase the model complexity. Then, the minimum and maximum states in $S_o$ that will appear in each section of the model can be determined using the procedure described above.

In an exemplary embodiment, this entire process of parameter selection can be conducted on an Intel i7 2.9 GHz processor in approximately 24 seconds. Once complete the model can be trained, which takes approximately 2 seconds, and will remain valid the entire year. However, any suitable computation resources, data sizes, a combination of resources and data sizes, or the like may be utilized, as desired.

Figure 10:
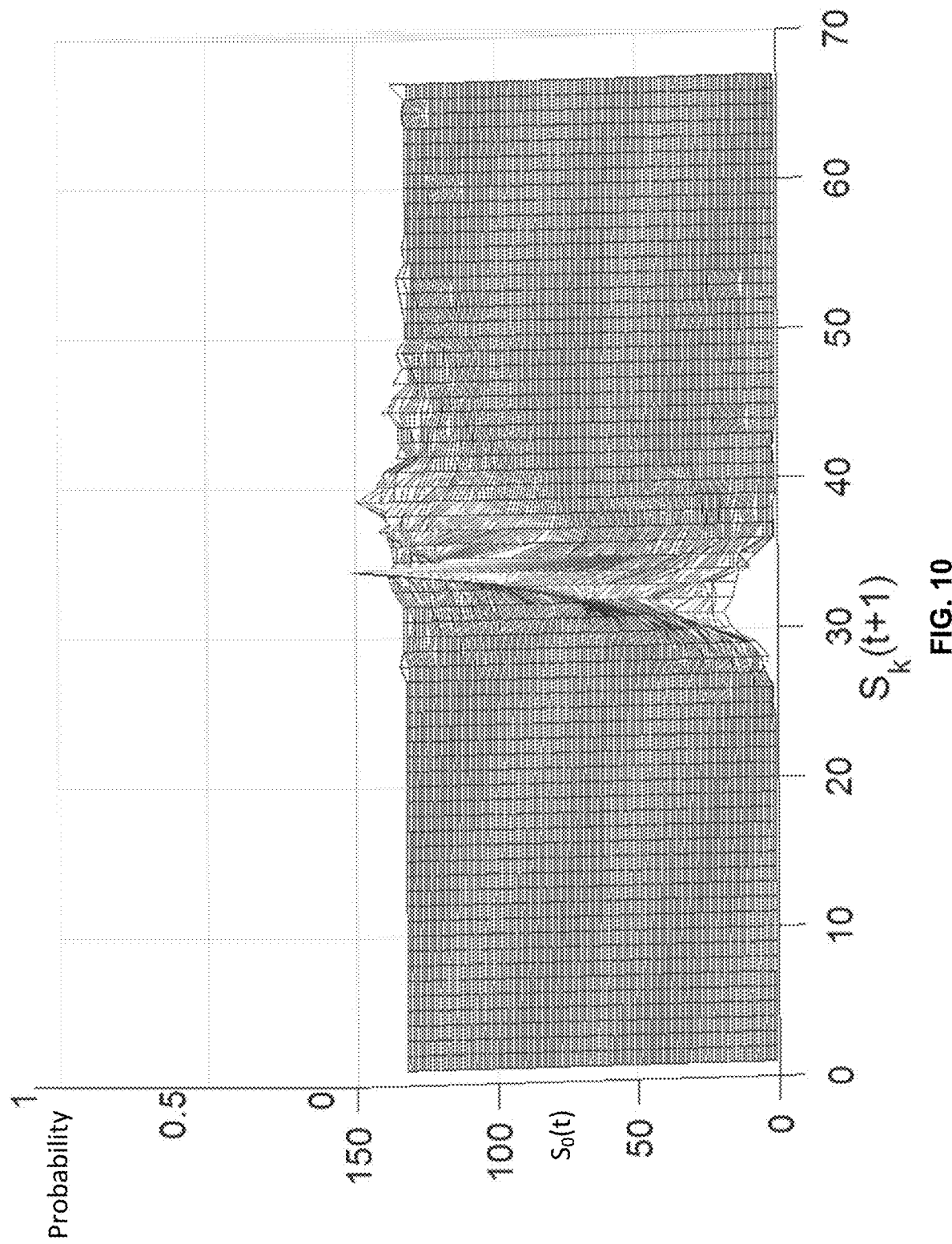
FIG. 10 illustrates an exemplary transition matrix Q for P=1. $-\Delta_k^{min}=\Delta_k^{max}=102.5$ MW, $\Delta_{o_1}^{min}=-19.8$ MW, and $\Delta_{o_1}^{max}=16.8$ MW in accordance with an exemplary embodiment.
Figure 11:
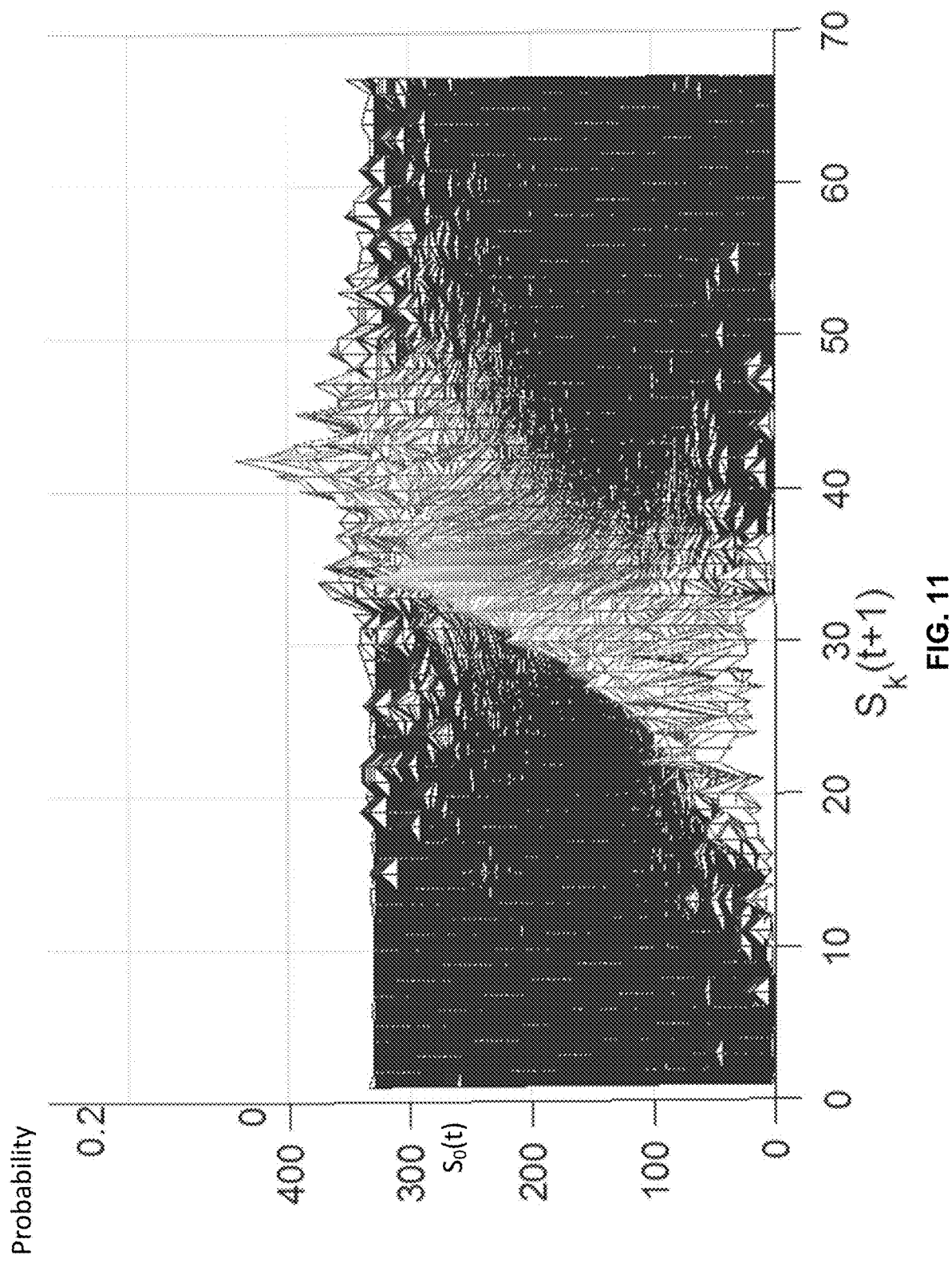
FIG. 11 illustrates an exemplary transition matrix Q for P=2. $-\Delta_k^{min}=\Delta_k^{max}=102.5$ MW, $\Delta_{o_2}^{min}=-44.3$ MW, and $\Delta_{o_2}^{min}=47.4$ MW in accordance with an exemplary embodiment.
Figure 12:
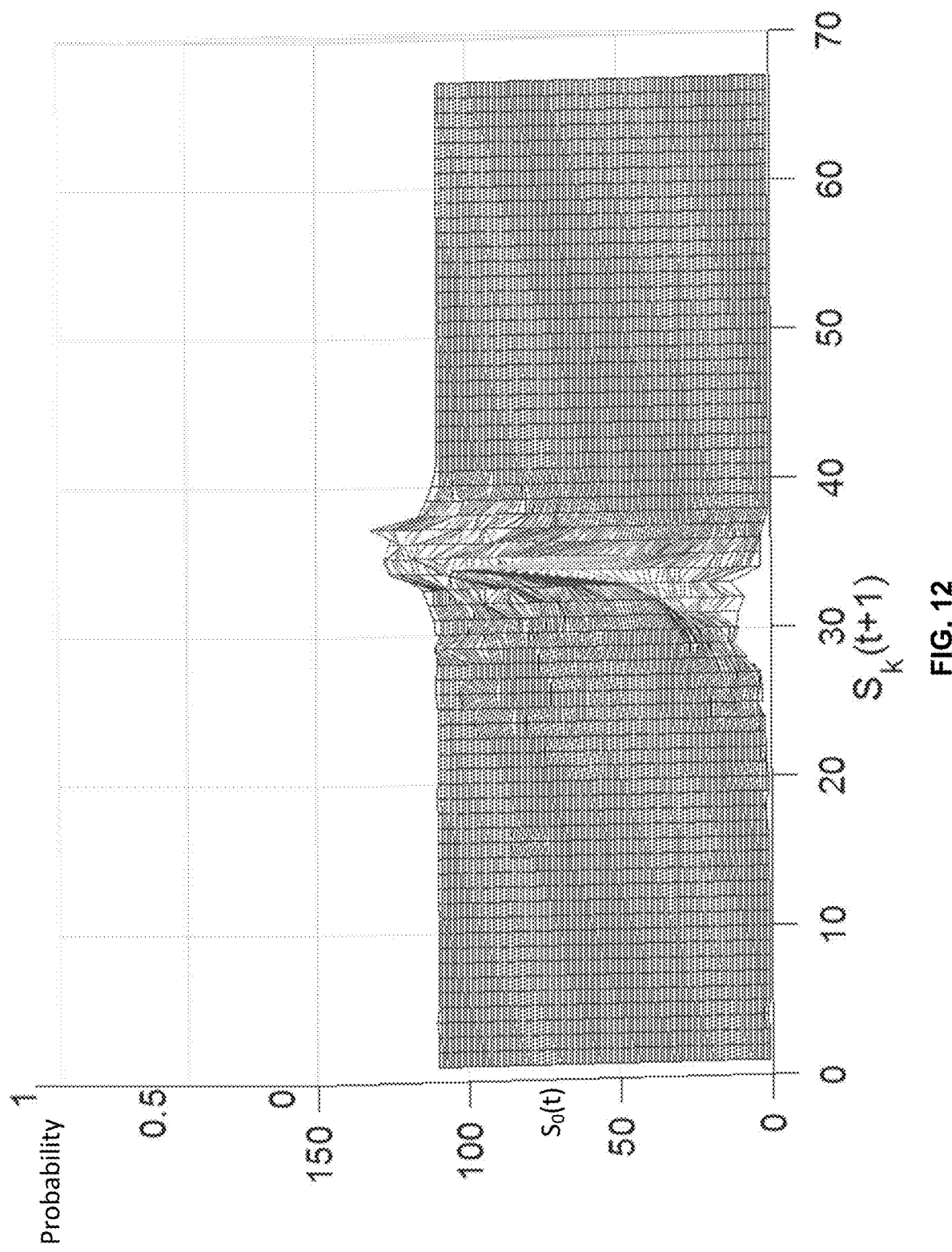
FIG. 12 illustrates an exemplary transition matrix Q for P=3. $-\Delta_k^{min}=\Delta_k^{max}=102.5$ MW, $\Delta_{o_3}^{min}=-10.7$ MW, and $\Delta_{o_3}^{min}=19.8$ MW in accordance with an exemplary embodiment.

Using all of the 2009 data for the 300.5 MW Colorado wind farm, the transition matrix Q was created for this example. FIG. 10 illustrates the section of Q where P=1, FIGS. 11 and 12 illustrate the sections of Q where P=2 and P=3, respectively. FIGS. 10, 11, and 12 illustrate that the difference process has greatly different behavior within the different levels of generation, seeing fewer large changes in power near the limits of the wind farm.

Forecast Results Using Colorado and PJM Wind Farm Data Sets

The IMC model may be applied to two different data sets in this section. One data set discussed previously comes from a 300.5 MW Colorado wind farm. The data from the 300.5 MW Colorado wind farm was measured in 2009 and 2010 at a 10-minute resolution. The other data set discussed below comes from a 200 MW wind farm located in the PJM power system. The data from the PJM wind farm was measured in 2014 and 2015 at a 5-minute resolution.

Table 2 illustrates various forecasting results using the Colorado wind farm data. For all tests, a single IMC model was trained using data from 2009, and the model was used to make 10-minute ahead forecasts of wind power on all of 2010. To simulate different amounts of data being available at the time of training, Table 2 includes cases trained using data from the last 3 months of 2009, data from the last 6 months of 2009, data from the last 9 months of 2009, and data for the full year of the 2009. In all cases, the tuning procedure discussed above was used to tune each model prior to training. Table 2 also includes a persistence forecast, Markov chain and support vector machine enhanced Markov chain for comparison.

The three performance metrics used in Table 2 are the mean absolute error (MAE), the root mean squared error (RMSE), and the continuous rank probability score (CRPS). The MAE and RMSE are point forecast metrics and the CRPS is a measure of distributional forecast quality. The MAE is a measure of difference between two continuous variables and the average absolute difference between the two continuous variables. The RMSE is the standard deviation of the residuals (prediction errors). The CRPS measures the closeness of a forecast distribution and corresponding observation. MAE, RMSE, and CRPS are common metrics used to evaluate forecasts.

Table 2 is an example of 10-minute ahead forecast performance using the Colorado data set training with 2009 data and testing over all of 2010.

TABLE 2

|  | MAE (MW) | RAISE (MW) | CRPS (MW) |
| --- | --- | --- | --- |
| Persistence | 6.270 | 10.860 | 6.270 |
| MC | 6.62 | 11.18 | 6.09 |
| SVM-MC | 5.95 | 10.01 | 5.14 |
| IMC-3 months | 4.918 | 8.749 | 3.693 |
| IMC-6 months | 4.911 | 8.745 | 3.693 |
| IMC-9 months | 4.902 | 8.681 | 3.679 |
| IMC-All Year | 4.894 | 8.669 | 3.676 |

Table 3 illustrates various forecasting results using the PJM wind farm data. For all tests, a single IMC model was trained using data from 2014 and the model was used to make 5-minute ahead forecasts of wind power on all of 2015. As in Table 2, to simulate different amounts of data being available at the time of training, Table 3 includes cases trained using the last 3 months, 6 months, 9 months, and the full year of 2014 training data. In all cases, the tuning procedure presented above was used to tune each model prior to training. Table 3 also includes a persistence forecast for comparison and the same performance metrics were used as before.

Table 3 is an example of 5-minute ahead forecast performance using the PJM data set trained with the 2014 training data and testing over all of 2015.

TABLE 3

|  | MAE (MW) | RMSE (MW) | CRPS (MW) |
|---|---|---|---|
| Persistence | 2.680 | 5.974 | 2.680 |
| IMC-3 months | 2.143 | 5.142 | 1.635 |
| IMC-6 months | 2.143 | 5.135 | 1.629 |
| IMC-9 months | 2.143 | 5.110 | 1.623 |
| IMC-All Year | 2.143 | 5.105 | 1.620 |

Table 2 illustrates that the IMC is better than persistence, reducing MAE by 21.9% and RSME by 20.1%. This is an improvement over other Markov chain methods that have been applied to the same data sets. The IMC has consistent performance even with increasingly limited training data. Table 3 illustrates that the PJM data is slightly more difficult to forecast, improving upon persistence by 20% and 14.5% in the MAE and RMSE performance metrics, respectively.

The IMC method can produce a non-parametric distributional forecast. This ability is reflected in the CRPS performance metric included in Tables 2 and 3. Again, this is an improvement over other Markov chain methods. For the case of the Colorado data set training with all of 2009, every distributional forecast that can be made by the model can be seen in FIGS. 9, 10, and 11.

Forecast Results Using the Australian Energy Market Operator Wind Farm Data Set

A third data set used comes from the Australian Energy Market Operator (AEMO) and contains data from 22 wind farms for the years of 2012 and 2013 in 5-minute resolution. The Australian data has been normalized by the nominal power of each wind farm to lie in the range 0 to 1. The Australian data was used in other forecasts, where sparse vector autoregression (sVAR) was applied to the 22 wind farms. The sVAR can capture the correlations between neighboring wind farms to improve individual site forecasts.

The Australian data set has been shown to be very difficult to improve upon relative to a persistence forecast. Using the system and methods described herein for IMC models, each of the 22 sites were forecasted individually and the performance metrics were averaged. An IMC trained with 2012 data was used to make 5-minute ahead forecasts on all of 2013 for each site. In all cases, the tuning procedure presented above was used to tune each model prior to training. Table 4 illustrates the results of the IMC forecasts, as well as persistence and sVAR for comparison. All metrics are shown as percentages of nominal power.

Table 4 is an example of 5-minute ahead mean forecast performance using the AEMO data set training with 2012 data and testing over all of 2013 for all 22 sites).

TABLE 4

|  | MAE (%) | RMSE (%) | CRPS (%) |
|---|---|---|---|
| Persistence | 2.308 | 3.956 | 2.308 |
| sVAR | 2.343 | 3.954 | 1.745 |
| IMC | 2.301 | 3.920 | 1.724 |

Figure 13:
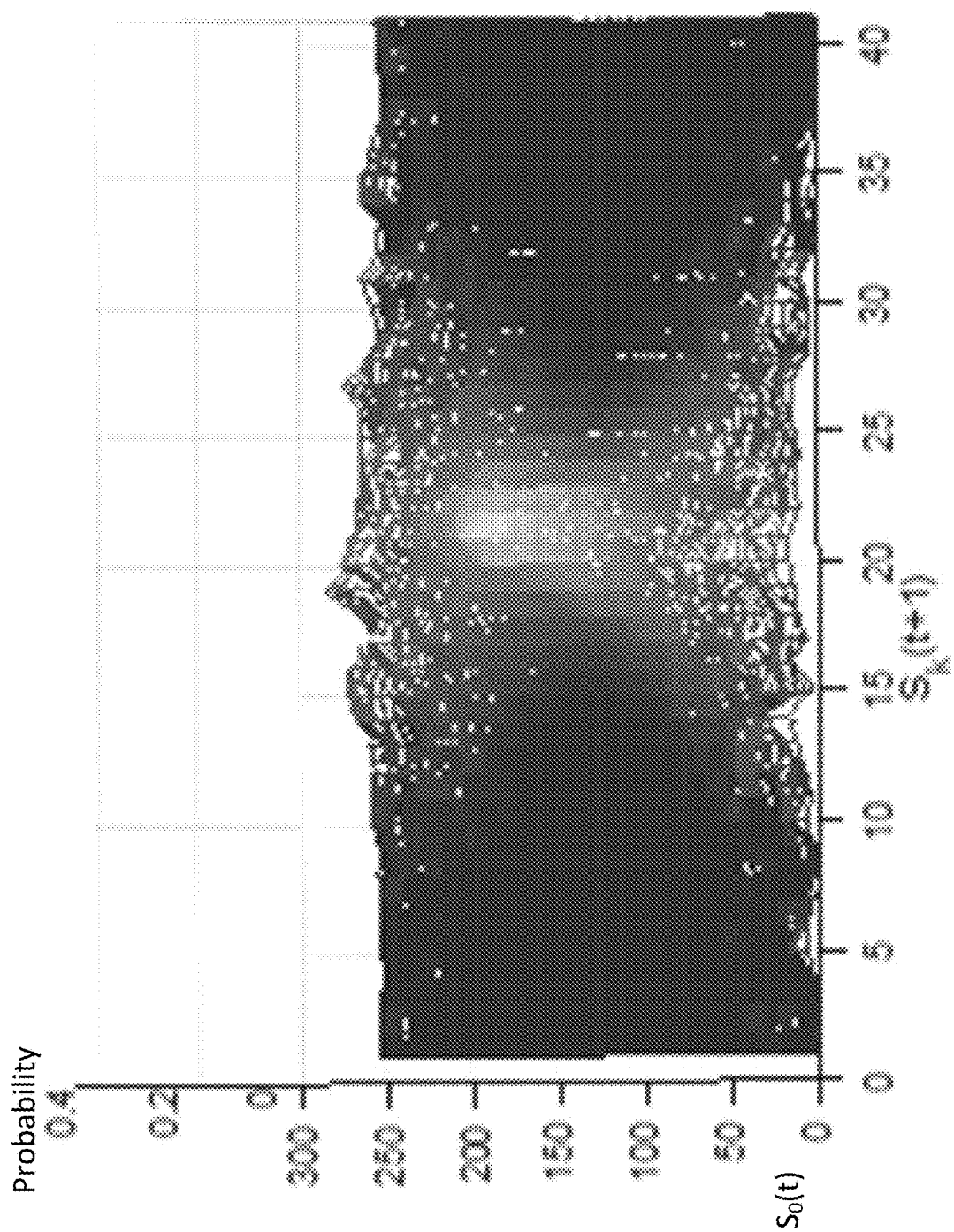
FIG. 13 illustrates an exemplary transition matrix Q for P=2. $-\Delta_k^{min}=\Delta_k^{max}=33.3\%$, $\Delta_{o_2}^{min}=-18.7\%$, and $\Delta_{o_2}^{min}=18.7\%$ using site 15 in the AEMO data set in accordance with an exemplary embodiment.

Table 4 illustrates that the IMC can improve upon persistence and sVAR in all metrics. Notice that the IMC only improves upon the persistence MAE by 0.3% and RMSE by 0.91% compared to over 20% when using the Colorado data set. FIG. 13 illustrates why this is the case.

FIG. 13 illustrates the transition matrix when P=2 (the middle interval of the generation level) using site 15 in the AEMO data set. The transition matrix shows mostly vertical and symmetrical distributions. Vertical and symmetrical distributions indicate that the wind farm is almost equally likely to go up or down in generation regardless of the change in power that has just occurred. When wind farm power output is equally likely to ramp up and ramp down, the point forecast will be +0 MW. Recall that a persistence forecast will always forecast a change of +0 MW. Therefore, because the behavior of this wind farm is very close to persistence to begin with, the forecast is very difficult to significantly improve upon. Now consider FIG. 11. In the Colorado wind farm the distributions are diagonal, not vertical. Diagonal distributions indicate that when a positive change in power is observed, the wind farm continuing to ramp up in power is much more likely than the wind farm ramping down. Thus, diagonal distributions results in an IMC forecast that is much different, and more accurate, than a persistence forecast. The two cases, vertical and diagonal distributions also suggest that the IMC should always be at least as good as a persistence forecast.

The systems and methods described herein may provide a method of very short-term wind power forecasting using an induced Markov chain (IMC) model. Markov chain models have very low complexity and can make point and non-parametric distributional forecasts. The IMC may improve upon other Markov chain methods by redefining states to model the difference process of the measured wind farm power output data. The IMC may also account for the changes in the difference process as the generation level of the wind farm changes and uses overlapping states to reduce discretization error in the model.

To facilitate practical implementation, a systematic tuning procedure is described herein. Every parameter in the IMC may be selected either from basic properties of the training set, or through an iterative search. In an example, the tuning procedure and model training took approximately 26 seconds using the Colorado 2009 data. The resulting IMC could then be used for an entire year of forecasting.

The IMC was applied to multiple data sets for validation, using one year of data for model training and the following year for evaluating forecast performance. Using the Colorado data set, the IMC was able to greatly improve upon persistence as well as other Markov chain-based methods even when using limited training data. Similar results were observed when using the PJM data. AEMO wind farm data was used to show the IMC is reliable and can be applied to wind farms that are difficult to forecast. The IMC was used to produce 5-minute ahead forecasts for 22 wind farms in southeastern Australia. Results showed the IMC was applied to improve upon persistence as well as sparse vector autoregression (sVAR), even though sVAR can account for the correlations between neighboring wind farms.

Overall, the IMC may be an efficient and effective method for very short-term wind farm forecasting. It is also contemplated that the systems and methods described herein may be applied and adapted for solar photovoltaic power forecasting.

Figure 14:
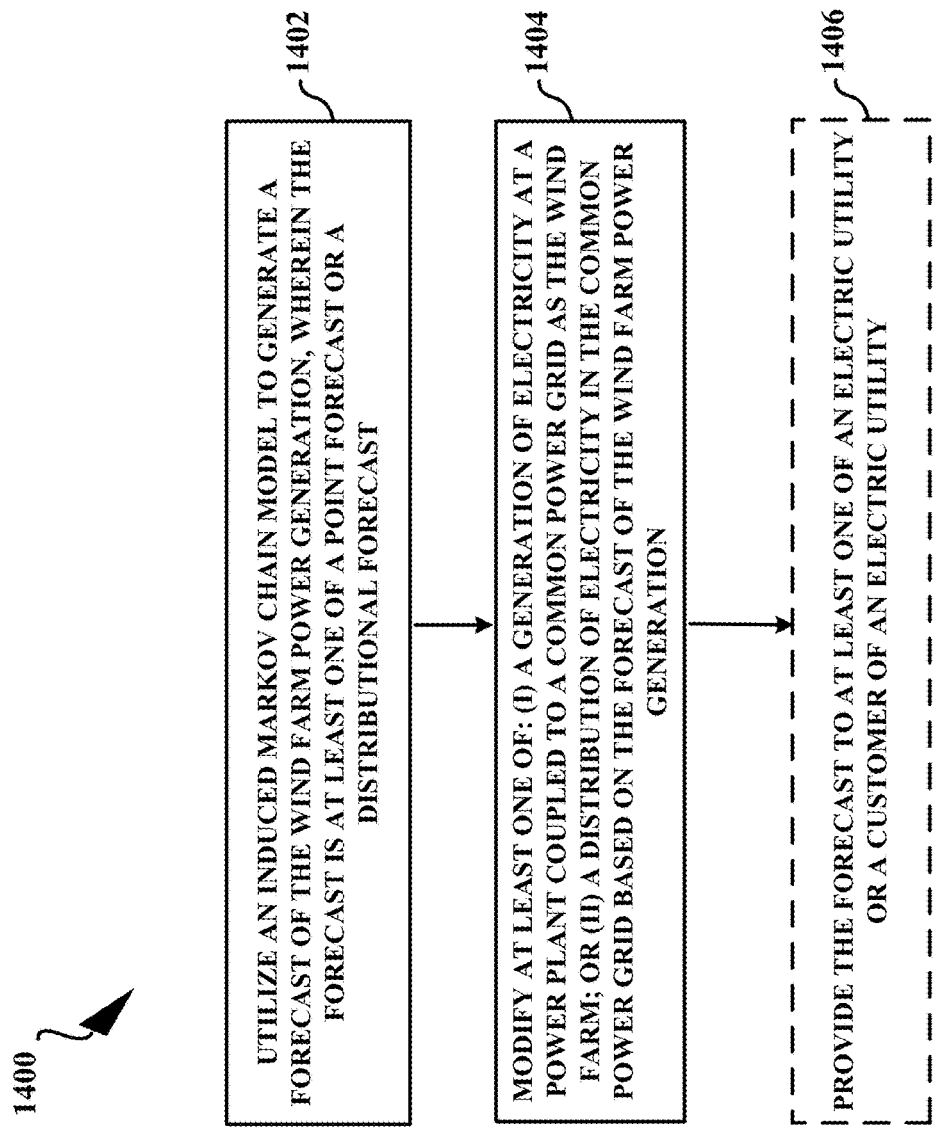
FIG. 14 illustrates a method for forecasting wind farm power generation in accordance with an exemplary embodiment.

FIG. 14 illustrates a method 1400 for forecasting wind farm power generation in accordance with an exemplary embodiment. The method 1400 includes utilizing an induced Markov chain model to generate a forecast of power generation of the wind farm. The forecast may be at least one of a point forecast or a distributional forecast (step 1402); and modifying at least one of: (i) a generation of electricity at a power plant coupled to a common power grid as the wind farm; or (ii) a distribution of electricity in the common power grid based on the forecast of power generation of the wind farm (step 1404). The method may, optionally, include providing the forecast to at least one of an electric utility or a customer of the electric utility (step 1406).

Figure 15:
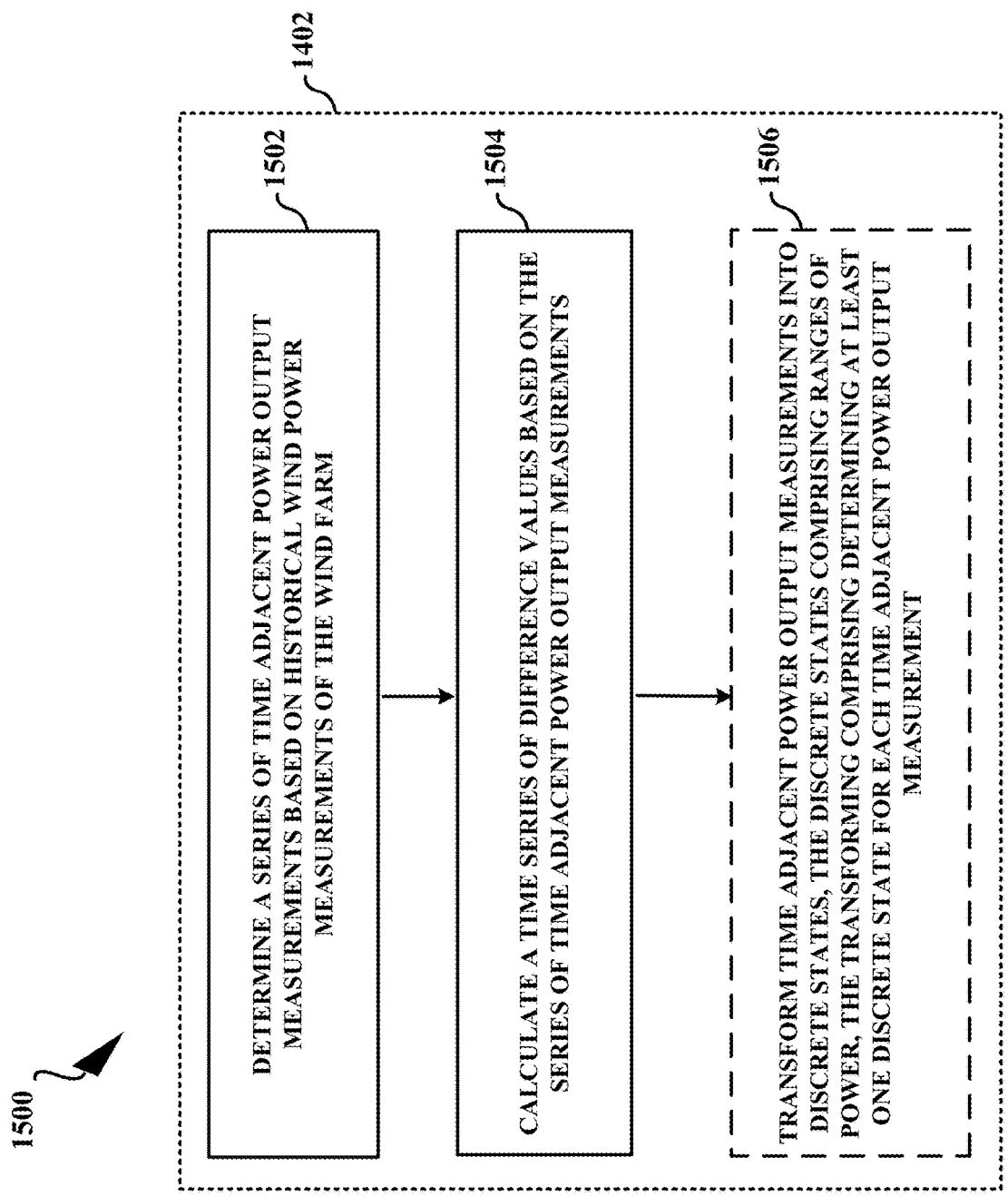
FIG. 15 illustrates a method for forecasting wind farm power generation in accordance with an exemplary embodiment.

Utilizing an induced Markov chain model to generate a forecast of power generation of the wind farm, wherein the forecast is at least one of a point forecast or a distributional forecast (step 1402) may include determining a series of time adjacent power output measurements based on historical wind power measurements of the wind farm (FIG. 15, step 1502) and calculating a time series of difference values based on the series of time adjacent power output measurements (FIG. 15, step 1504), as illustrated in FIG. 15. The induced Markov chain model may operate using discrete-time. For example, 5 minute, 10 minute, or other blocks of time may be used to define the training data used. Additionally, the induced Markov chain model may be defined in terms of a series of finite states. For example, the power output of a wind farm may be quantized between ranges of power output values. In an example embodiment, the point forecast may be a single value that represents the best guess of what the power output will be in the future. In an example embodiment, the distributional forecast may contain the probability that any value of power output may appear in the future.

In an exemplary embodiment, a forecast generated may be used to modify a generation of electricity at a power plant coupled to a common power grid as the wind farm. For example, the forecast may be provided to an electric utility (step 1406). Accordingly, the electric utility may modify the generation of electricity at one or more of the electrical utility's power plants (or other plants providing power to the utility) to provide the total power needed for the local electric grid. For example: a rate of fuel consumed at a power plant may be increased and/or decreased, a power plant may be "turned on" and begin generating electricity, a power plant may be "turned off" and cease generating electricity, and/or the like. Thus, if the local power grid needs a total power, $P_{TOTAL}$, due to the demands of the consumers of the electrical utility, and the wind farm can create an amount of power, $P_{WIND\ FARM}$, then, when $P_{TOTAL} > P_{WIND\ FARM}$, one or more other power plants will need to generate an amount of power, $P_{POWER\ PLANT}$, where generally $$P_{POWER\ PLANT} = P_{TOTAL} - P_{WIND\ FARM} \quad (5)$$

Generally, $P_{TOTAL}$ will be greater than $P_{WIND\ FARM}$. In an area where this is not true, wind farm generators may not need to generate any power during times when $P_{WIND\ FARM} > P_{TOTAL}$.

In an exemplary embodiment, a forecast generated may be used to modify the distribution of electricity in the common power grid based on the forecast of power generation of the wind farm. For example, the forecast may be provided to an electric utility (step 1406). The electric utility may then determine how power should be distributed based on where the power is being generated, e.g., at a wind farm (or wind farms) or at other power plants, based on where the power is being used, and based on available power transmission resources used to transmit the power being generated to location where the power is being used.

In an exemplary embodiment, modifying the generation of electricity results in reduced greenhouse gas emissions associated with the generation of electricity. For example, wind farms may generally produce less greenhouse gas emissions when compared to many other types of electrical power generating facilities. Accordingly, modifying the generation of electricity to use more wind farm generated energy when available may result in decreased greenhouse gas emissions.

In an exemplary embodiment, modifying the generation of electricity results in decreased costs associated with the generation of electricity. For example, wind farms may, in some cases, be less expensive to operate compared to many other types of electrical power generating facilities. Accordingly, modifying the generation of electricity to use more wind farm generated energy when available may result in decreased costs associated with the generation of electricity.

In an exemplary embodiment, the forecast of the power generation of the wind farm predicts the power output of the wind farm for a period of between about 5 seconds and about 6 hours into the future. For example, historic data samples may be taken in ranges of time from, for example, about 5 seconds to about 6 hours. The samples may be used to train an IMC based system to predict the power output of the wind farm for a period of between about 5 seconds and about 6 hours into the future. Generally, forecasts using data in ranges from 5 minutes to 15 minutes may be preferable. Forecast accuracy may reduce as forecast horizon increases. For example, a forecast using data measured every hour may be less accurate than a forecast using data measured every 15 minutes. A forecast using data measured every 15 minutes may be less accurate than a forecast using data measured every 5 minutes. However, at some point, the amount of data generated using shorter times between measurements and/or the amount of processing needed to process the data may increase system cost and/or system complexity without a significant increase in system performance.

FIG. 15 illustrates a method 1500 for forecasting wind farm power generation in accordance with an exemplary embodiment. FIG. 15 illustrates sub-steps (step 1502, 1504, and 1506) of step 1402 of FIG. 14. In an exemplary embodiment, utilizing the induced Markov chain model to generate the forecast of the power generation of the wind farm (step 1402 of FIG. 14) may include determining a series of time adjacent power output measurements based on historical wind power measurements of the wind farm (step 1502) and calculating a time series of difference values based on the series of time adjacent power output measurements (step 1504). Utilizing the induced Markov chain model to generate the forecast of the power generation of the wind farm (step 1402 of FIG. 14) may further include transforming time adjacent power output measurements into discrete states. The discrete states may include ranges of power. The transforming may include determining at least one discrete state for each time adjacent power output measurement (step 1506). In an exemplary embodiment, determining the series of time adjacent power output measurements and calculating the time series of difference values occurs before forecasting begins. In an exemplary embodiment, the discrete states include at least one overlapping state.

Determining a series of time adjacent power output measurements based on historical wind power measurements of the wind farm (step 1502) may include processing the historical data and creating a series of power output measurements in time order. Calculating a time series of difference values based on the series of time adjacent power output measurements (step 1504) may include calculating a difference value between each adjacent power output measurement. The difference value may be a change from one power output measurement to the next power output measurement. Accordingly, a series of difference values may be generated based on the difference or delta between adjacent power output measurements.

Discrete states may include ranges of power or ranges of difference values (e.g., changes in power). Transforming time adjacent power output measurements (or difference values) into discrete states may include determining a plurality of output power ranges (or ranges of change in output power) and assigning each adjacent power output measurement (or change in power range) into one or more ranges of output power or changes output power ranges. (In an exemplary embodiment, the output power ranges may overlap.) The transforming may include determining at least one discrete state for each time adjacent power output measurement (step 1506).

Principles of the present disclosure may be compatible with and/or utilize certain components or techniques disclosed in other U.S. patents and/or U.S. patent applications, including but not limited to: (i) U.S. Pat. No. 9,460,478 to Zhang entitled "SYSTEM AND METHOD FOR WIND GENERATION FORECASTING" and (ii) U.S. Pat. No. 10,181,101 to Zhang entitled "SUPPORT VECTOR MACHINE ENHANCED MODELS FOR SHORT-TERM WIND FARM GENERATION FORECASTING". Each of the foregoing are hereby incorporated by reference in their entireties for all purposes (but except for any subject matter disclaimers or disavowals, and except to the extent that the incorporated material is inconsistent with the express disclosure herein, in which case the language in this disclosure shall control).

The present disclosure has been described with reference to various embodiments. However, one of ordinary skill in the art appreciates that various modifications and changes can be made without departing from the scope of the present disclosure. Accordingly, the specification is to be regarded in an illustrative rather than a restrictive sense, and all such modifications are intended to be included within the scope of the present disclosure. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element of any or all the claims.

As used herein, the meaning of the term "non-transitory computer-readable medium" should be construed to exclude only those types of transitory computer-readable media which were found in In re Nuijten, 500 F.3d 1346 (Fed. Cir. 2007) to fall outside the scope of patentable subject matter under 35 U.S.C. § 101, so long as and to the extent In re Nuijten remains binding authority in the U.S. federal courts and is not overruled by a future case or statute. Stated another way, the term "computer-readable medium" should be construed in a manner that is as broad as legally permissible.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of embodiments encompassed by this disclosure. The scope of the claimed matter in the is accordingly to be limited by nothing other than the appended claims, in which reference to an element in the singular is not intended to mean "one and only one" unless explicitly so stated, but rather "one or more."

Systems, methods, and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. § 112(f), unless the element is expressly recited using the phrase "means for." As used herein, the terms "comprises", comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

When language similar to "at least one of A, B, or C" or "at least one of A, B, and D" is used in the claims, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

What is claimed is:

1. A method for forecasting power generation in a wind farm, the method comprising:

utilizing, by a processor, an induced Markov chain model to generate a forecast of power generation of the wind farm, wherein the forecast is at least one of a point forecast or a distributional forecast; and modifying at least one of: (i) a generation of electricity at a power plant coupled to a common power grid as the wind farm; or (ii) a distribution of electricity in the common power grid based on the forecast of power generation of the wind farm, wherein utilizing the induced Markov chain model to generate the forecast of the power generation of the wind farm comprises:

determining a series of time adjacent power output measurements based on historical wind power measurements of the wind farm;

transforming time adjacent power output measurements into discrete states, the discrete states comprising ranges of power, the transforming comprising determining at least one discrete state for each time adjacent power output measurement, wherein the discrete states comprise at least one overlapping state, the overlapping state having a first range of power overlapping with a second range of power of another state; and calculating a time series of difference values based on the series of time adjacent power output measurements including calculating a difference value between adjacent power output measurements of the series of time adjacent power output measurements.

2. The method of claim 1, wherein determining the series of time adjacent power output measurements and calculating the time series of difference values occurs before forecasting begins.

3. The method of claim 1, further comprising providing the forecast to at least one of an electric utility or a customer of the electric utility.

4. The method of claim 1, wherein the modifying the generation of electricity results in reduced greenhouse gas emissions associated with the generation of electricity.

5. The method of claim 1, wherein the modifying the generation of electricity results in decreased costs associated with the generation of electricity.

6. The method of claim 1, wherein the forecast of the power generation of the wind farm predicts power output of the wind farm for a period of between 5 seconds and 6 hours into the future.

7. A device for forecasting power generation in a wind farm, the device comprising a processor configured to be in electrical communication with a wind farm power output sensor, wherein the processor is configured to:

utilize an induced Markov chain model to generate a forecast of the power generation of the wind farm, wherein the forecast is at least one of a point forecast or a distributional forecast; and modify at least one of: (i) a generation of electricity at a power plant coupled to a common power grid as the wind farm; or (ii) a distribution of electricity in the common power grid based on the forecast of the power generation of the wind farm, wherein utilizing the induced Markov chain model to generate the forecast of the power generation of the wind farm comprises:

determining a series of time adjacent power output measurements based on historical wind power measurements of the wind farm; and calculating a time series of difference values based on the series of time adjacent power output measurements including calculating a difference value between adjacent power output measurements of the series of time adjacent power output measurements, wherein the processor is further configured to transform time adjacent power output measurements into discrete states, the discrete states comprising ranges of power, the transforming comprising determining at least one discrete state for each of the time adjacent power output measurements, and wherein the discrete states comprise at least one overlapping state, the overlapping state having a first range of power overlapping with a second range of power of another state.

8. The device of claim 7, wherein determining the series of time adjacent power output measurements and calculating the time series of difference values occurs before forecasting begins.

9. The device of claim 7, wherein the processor is further configured to provide the forecast to at least one of an electric utility or a customer of the electric utility.

10. The device of claim 7, wherein the modifying the generation of electricity results in reduced greenhouse gas emissions associated with the generation of electricity.

11. The device of claim 7, wherein the modifying the generation of electricity results in decreased costs associated with the generation of electricity.

12. The device of claim 7, wherein the forecast of the power generation of the wind farm predicts power output of the wind farm for a period of between 5 seconds and 6 hours into the future.

13. A system for forecasting power generation in a wind farm, the system comprising:

a wind farm power output sensor; and a processor configured to be in electrical communication with the wind farm power output sensor, wherein the processor is configured to:

utilize an induced Markov chain model to generate a forecast of the power generation of the wind farm, wherein the forecast is at least one of a point forecast or a distributional forecast; and modify at least one of: (i) a generation of electricity at a power plant coupled to a common power grid as the wind farm; or (ii) a distribution of electricity in the common power grid based on the forecast of the power generation of the wind farm, wherein utilizing the induced Markov chain model to generate the forecast of the power generation of the wind farm comprises:

determining a series of time adjacent power output measurements based on historical wind power measurements of the wind farm; and calculating a time series of difference values based on the series of time adjacent power output measurements including calculating a difference value between adjacent power output measurements of the series of time adjacent power output measurements, wherein the processor is further configured to transform time adjacent power output measurements into discrete states, the discrete states comprising ranges of power, the transforming comprising determining at least one discrete state for each of the time adjacent power output measurements, and wherein the discrete states comprise at least one overlapping state, the overlapping state having a first range of power overlapping with a second range of power of another state.

* * * * *